(12) United States Patent
Dillman et al.

(10) Patent No.: US 10,350,956 B2
(45) Date of Patent: *Jul. 16, 2019

(54) SUSPENSION ELEMENT

(71) Applicant: Oshkosh Defense, LLC, Oshkosh, WI (US)

(72) Inventors: Patrick S. Dillman, Hartford, WI (US); Robert K. Sollenskog, Oshkosh, WI (US); Erik Ellifson, Oshkosh, WI (US); Aaron J. Rositch, Omro, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,268

(22) Filed: Apr. 16, 2018

(65) Prior Publication Data

US 2018/0229569 A1 Aug. 16, 2018

Related U.S. Application Data

(63) Continuation of application No. 14/684,082, filed on Apr. 10, 2015, now Pat. No. 9,944,145.

(Continued)

(51) Int. Cl.
*B60G 13/06* (2006.01)
*B60G 15/12* (2006.01)
(Continued)

(52) U.S. Cl.
CPC .............. *B60G 15/12* (2013.01); *B60G 17/08* (2013.01); *F16F 9/06* (2013.01); *F16F 9/062* (2013.01);
(Continued)

(58) Field of Classification Search
CPC .......... F16F 9/062; F16F 9/063; F16F 9/3292; B60G 21/073
See application file for complete search history.

(56) References Cited

U.S. PATENT DOCUMENTS 3,944,270 A 3/1976 Kreuzer
5,180,039 A 1/1993 Axthammer et al.
(Continued)

FOREIGN PATENT DOCUMENTS

GB 0 899 480 6/1962
WO WO-2006/010207 2/2006
WO WO-2007/031821 3/2007

OTHER PUBLICATIONS

International Search Report and Written Opinion for PCT Application No. PCT/US2015/025400, dated Jul. 6, 2015, 12 pages.

*Primary Examiner* — Bradley T King
(74) *Attorney, Agent, or Firm* — Foley & Lardner LLP

(57) ABSTRACT

A suspension element includes a main body having an internal volume configured to contain a liquid therein, a tubular element extending at least partially within the main body, the tubular element having an internal volume that defines a first fluid chamber configured to contain a compressible gas therein, a first piston separating the internal volume of the main body into a second fluid chamber and a third fluid chamber, a second piston positioned to separate the first fluid chamber from the second fluid chamber, and a flow control element disposed along a flow path between the second fluid chamber and the third fluid chamber. Movement of the tubular element generates a flow of the liquid through the flow control element to produce a damping force and changes the pressure of the compressible gas to produce a spring force.

17 Claims, 21 Drawing Sheets

Related U.S. Application Data

(60) Provisional application No. 61/978,624, filed on Apr. 11, 2014.

(51) Int. Cl.
  B60G 17/08 (2006.01)
  F16F 9/32 (2006.01)
  F16F 9/46 (2006.01)
  F16F 9/06 (2006.01)

(52) U.S. Cl.
  CPC .............. *F16F 9/063* (2013.01); *F16F 9/067* (2013.01); *F16F 9/3292* (2013.01); *F16F 9/46* (2013.01); *B60G 2202/152* (2013.01); *B60G 2202/24* (2013.01); *B60G 2202/30* (2013.01); *B60G 2500/10* (2013.01); *B60G 2500/2014* (2013.01)

(56) References Cited

U.S. PATENT DOCUMENTS

| | | | |
|---|---|---|---|
| 5,653,425 A | 8/1997 | Page et al. |
| 6,446,944 B1 | 9/2002 | Ward |
| 6,698,729 B2 | 3/2004 | Popjoy |
| 7,270,222 B1 | 9/2007 | Aymar |
| 7,325,660 B2 | 2/2008 | Norgaard et al. |
| 8,196,721 B2 | 6/2012 | Gabriel et al. |
| 8,333,390 B2 | 12/2012 | Linsmeier et al. |
| 8,459,619 B2 | 6/2013 | Trinh et al. |
| 8,465,025 B2 | 6/2013 | Venton-Walters et al. |
| 8,596,648 B2 | 12/2013 | Venton-Walters et al. |
| 8,764,029 B2 | 7/2014 | Venton-Walters et al. |
| 8,801,017 B2 | 8/2014 | Ellifson et al. |
| 8,821,130 B2 | 9/2014 | Venton-Walters et al. |
| 8,876,133 B2 | 11/2014 | Ellifson |
| 8,991,834 B2 | 3/2015 | Venton-Walters et al. |
| 9,045,014 B1 | 6/2015 | Verhoff et al. |
| 2002/0100649 A1 | 8/2002 | Agrotis et al. |
| 2004/0004316 A1 | 1/2004 | Robertson |
| 2006/0163017 A1 | 7/2006 | Verriet |
| 2006/0185950 A1 | 8/2006 | Gaile |
| 2008/0093818 A1 | 4/2008 | Nykanen et al. |
| 2009/0007626 A1 | 1/2009 | Bochen et al. |
| 2009/0309278 A1 | 12/2009 | Axelsson et al. |
| 2012/0048665 A1 | 3/2012 | Marking |
| 2012/0205843 A1 | 8/2012 | Allen et al. |
| 2012/0234638 A1 | 9/2012 | Ellifson et al. |
| 2013/0249183 A1 | 9/2013 | Ellifson et al. |
| 2014/0251742 A1 | 9/2014 | Dillman et al. |
| 2014/0271066 A1 | 9/2014 | Hou |
| 2014/0326555 A1 | 11/2014 | Ellifson et al. |
| 2014/0334956 A1 | 11/2014 | Venton-Walters et al. |
| 2015/0028529 A1 | 1/2015 | Ellifson |
| 2015/0145188 A1 | 5/2015 | Polakowski et al. |
| 2015/0191069 A1 | 7/2015 | Zuleger et al. |
| 2015/0197129 A1 | 7/2015 | Venton-Walters et al. |

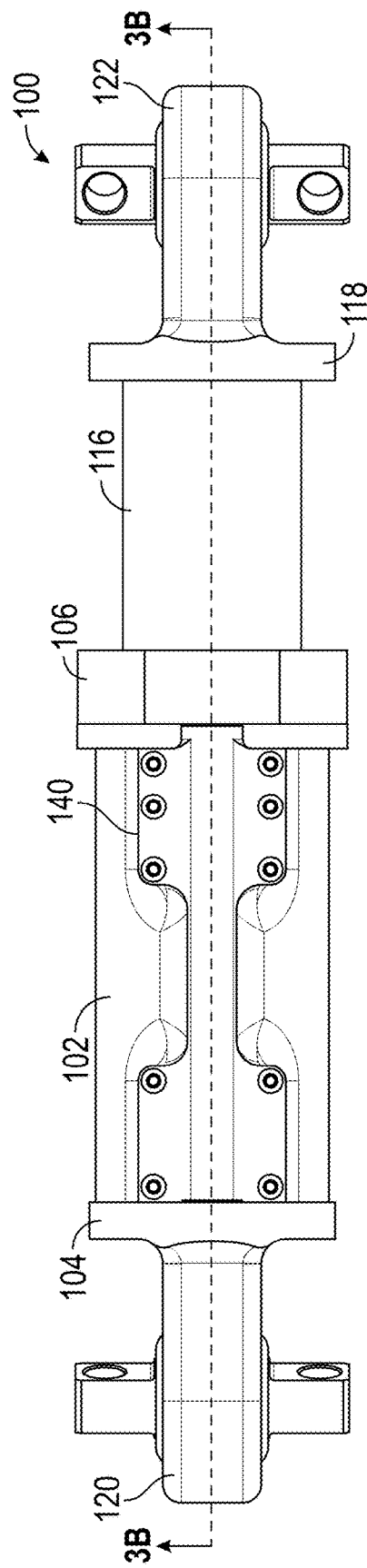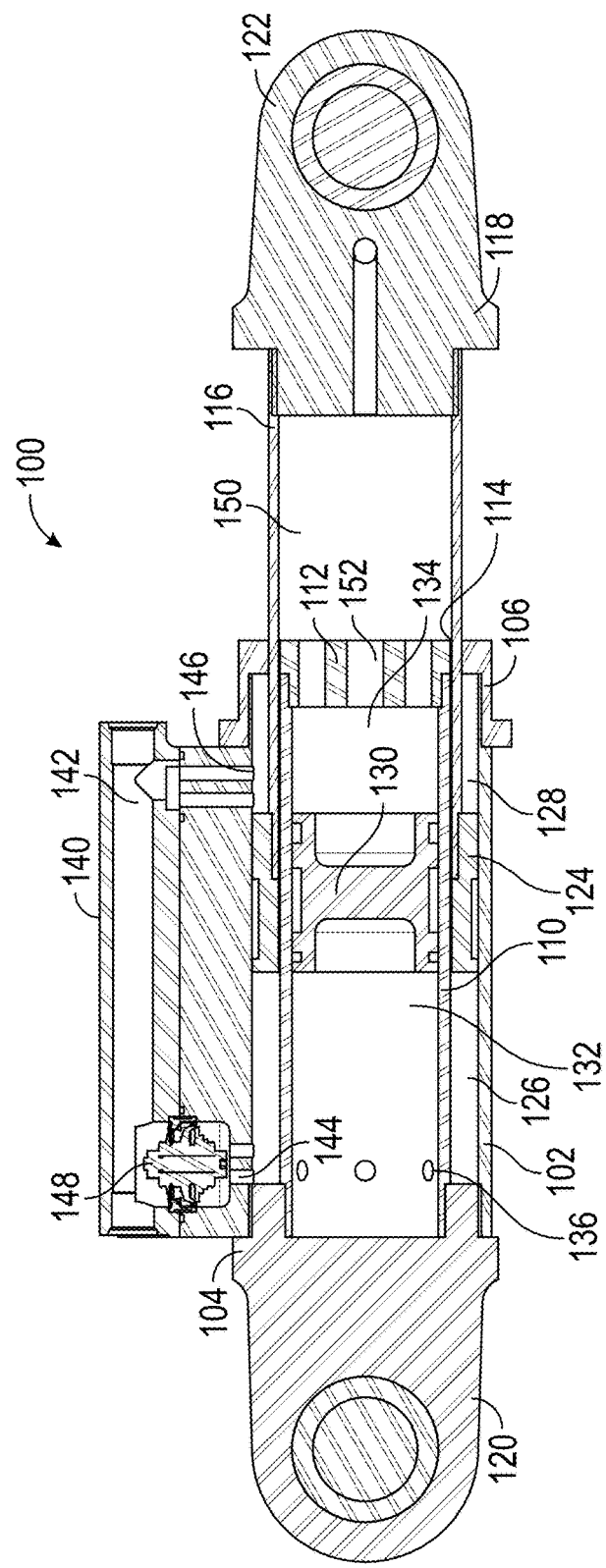
FIG. 3A
FIG. 3B

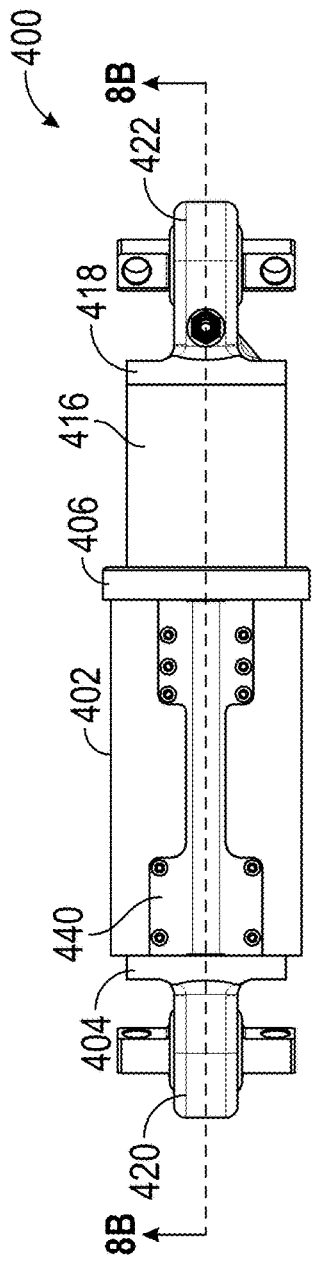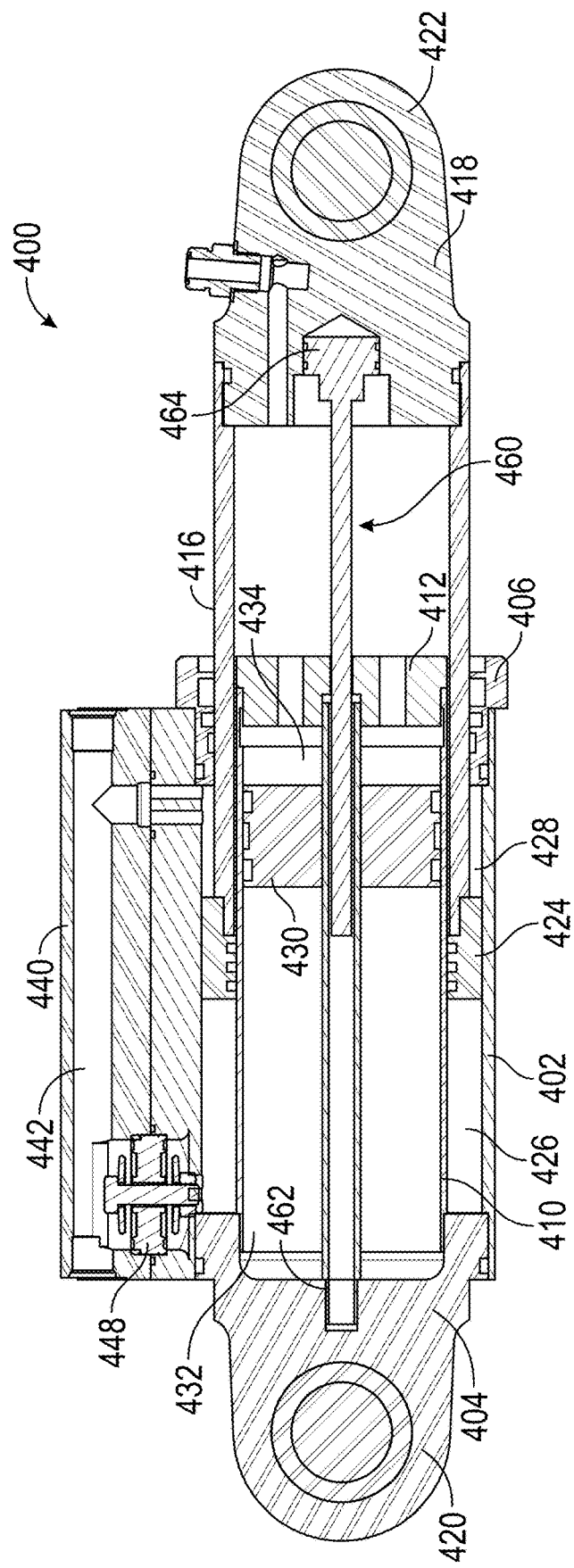

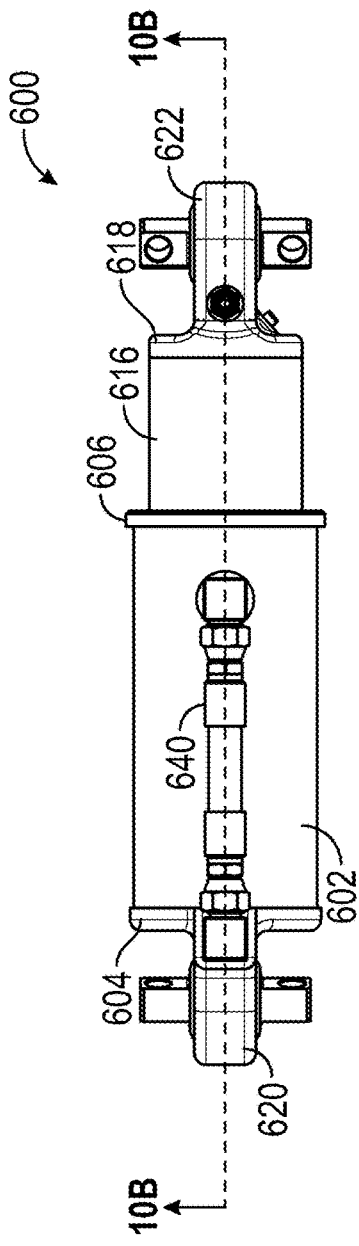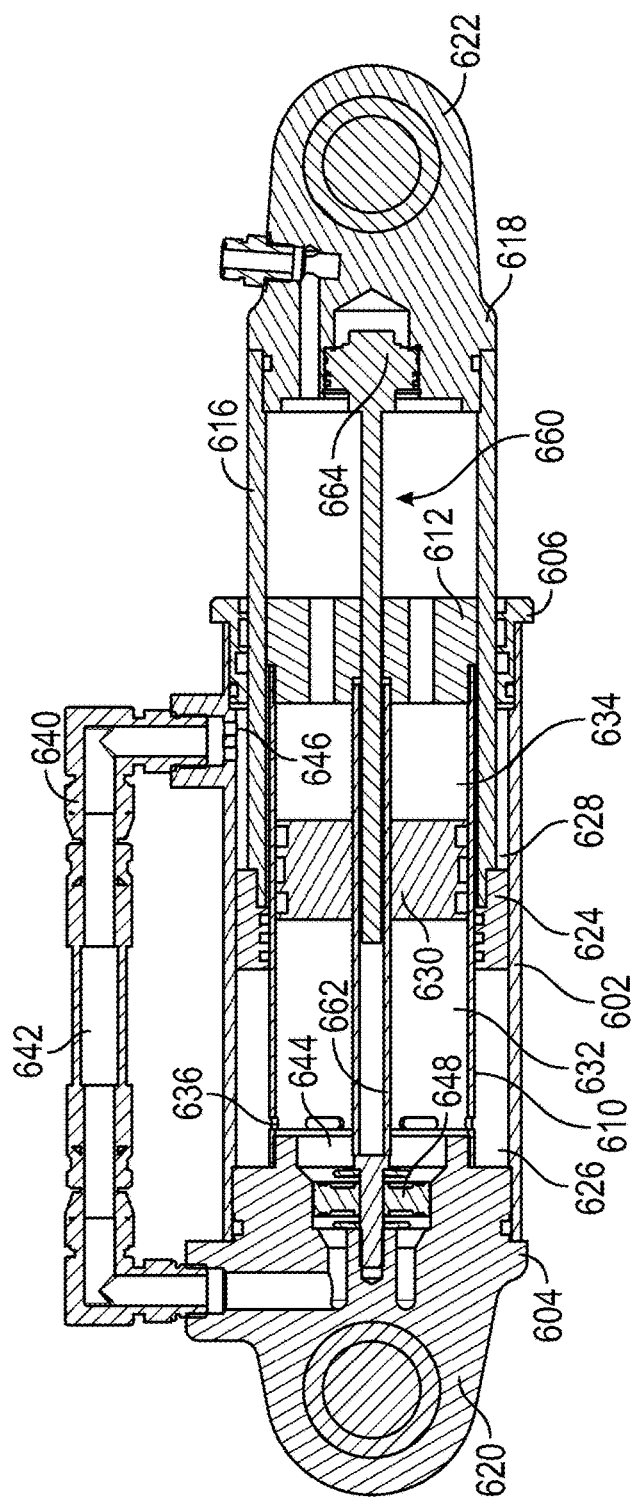

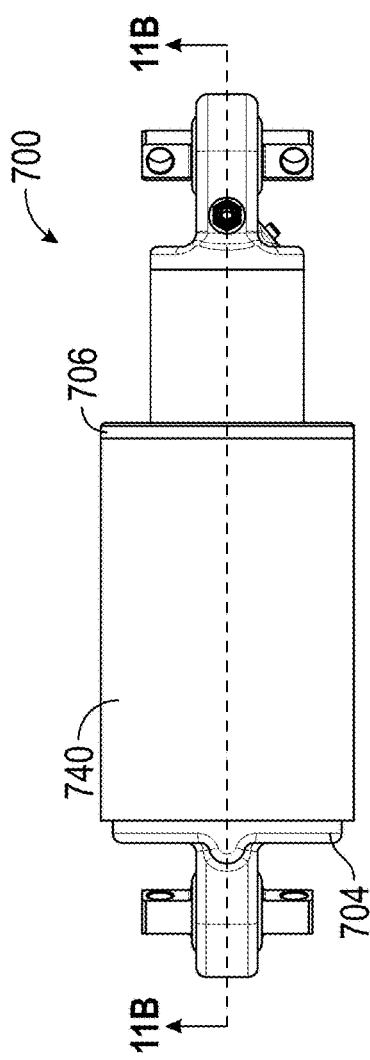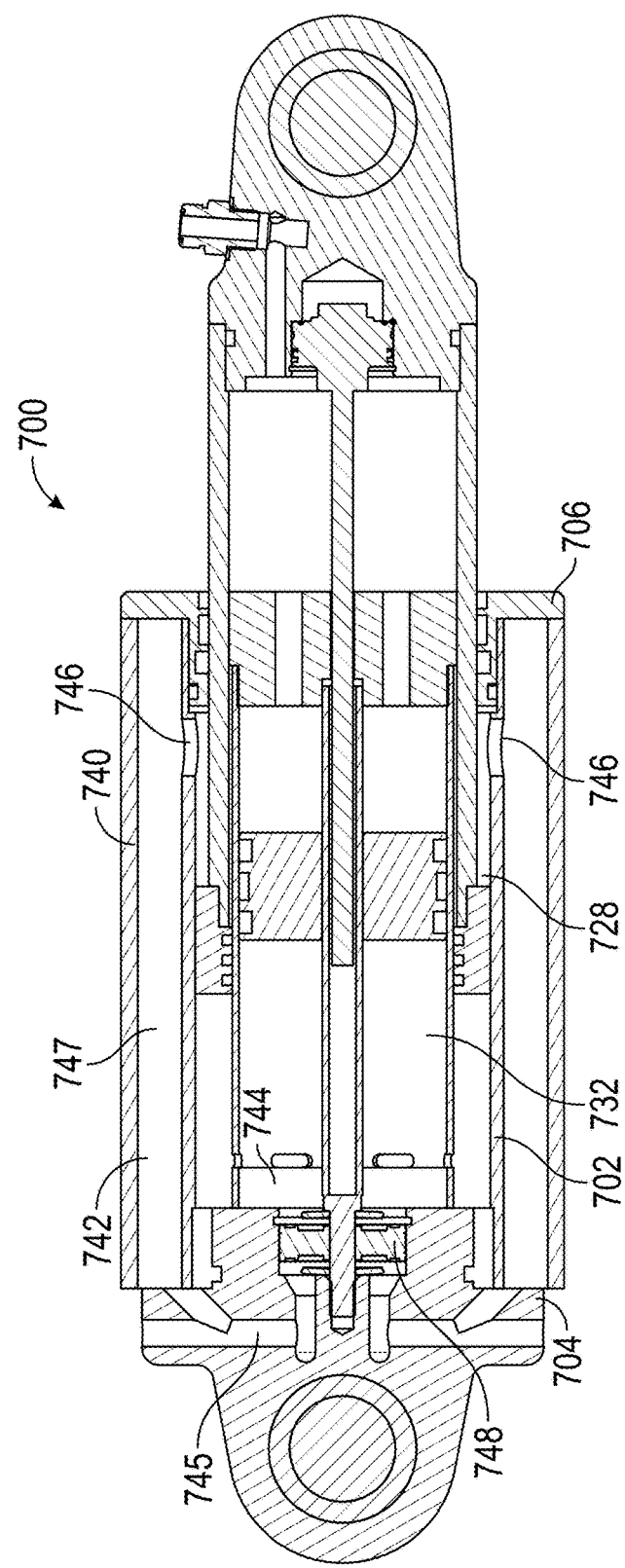
FIG. 11A
FIG. 11B

SUSPENSION ELEMENT

CROSS-REFERENCE TO RELATED PATENT APPLICATIONS

This application is a continuation of U.S. application Ser. No. 14/684,082, filed Apr. 10, 2015, which claims the benefit of U.S. Provisional Application No. 61/978,624, filed Apr. 11, 2014, both of which are incorporated herein by reference in their entireties.

BACKGROUND

Suspension systems traditionally couple a body of a vehicle to one or more axles. Such suspension systems may include solid axle suspension systems or independent suspension systems, among others. Independent suspension systems facilitate independent wheel movement as the vehicle encounters one or more obstacles (e.g., uneven terrain, potholes, curbs, etc.). The independent suspension system reduces the forces experienced by passengers as the vehicle encounters the obstacles. Independent suspension systems include one or more arms (e.g., A-arms, swing arms, etc.) that are coupled to a hub, to which a wheel and tire assembly is attached. Various suspension components are coupled to the arms and the body of the vehicle.

SUMMARY

One embodiment relates to a suspension element that includes a main body having an internal volume configured to contain a liquid therein, a tubular element extending at least partially within the main body, the tubular element having an internal volume that defines a first fluid chamber configured to contain a compressible gas therein, a first piston separating the internal volume of the main body into a second fluid chamber and a third fluid chamber, a second piston positioned to separate the first fluid chamber from the second fluid chamber, and a flow control element disposed along a flow path between the second fluid chamber and the third fluid chamber. Movement of the tubular element generates a flow of the liquid through the flow control element to produce a damping force and changes the pressure of the compressible gas to produce a spring force.

Another embodiment relates to a suspension element that includes a main body having an internal volume configured to contain a liquid therein, a tubular element having an internal volume that defines a first fluid chamber configured to contain a compressible gas therein, a first piston separating the internal volume of the main body into a second fluid chamber and a third fluid chamber, a second piston separating the first fluid chamber from the second fluid chamber, a flow control element disposed along a flow path between the second fluid chamber and the third fluid chamber, and a ride height sensor positioned to monitor an orientation of the tubular element relative to the main body.

Still another embodiment relates to a suspension system for a vehicle that includes a first suspension element and a second suspension element. Each of the first suspension element and the second suspension element include a main body having an internal volume configured to contain a liquid therein, a tubular element extending at least partially within the main body, the tubular element having an internal volume that defines a first fluid chamber configured to contain a compressible gas therein, a first piston separating the internal volume of the main body into a second fluid chamber and a third fluid chamber, a second piston positioned to separate the first fluid chamber from the second fluid chamber, and a flow control element.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, in which:

FIG. 3A is a side view of a suspension element, according to an exemplary embodiment;

FIG. 3B is a sectional view of the suspension element of FIG. 3A;

FIG. 8A is a side view of a suspension element, according to an alternative embodiment;

FIG. 8B a sectional view of the suspension element of FIG. 8A;

FIG. 10A is a side view of a suspension element, according to an alternative embodiment;

FIG. 10B is a sectional view of the suspension element of FIG. 10A;

FIG. 11A is a side view of an suspension element, according to an alternative embodiment;

FIG. 11B is a sectional view of the suspension element of FIG. 11A;

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a vehicle may include a body supported by a suspension system. In some embodiments, the vehicle is a military vehicle. In other embodiments, the vehicle is a utility vehicle, such as a fire truck, a tractor, construction equipment, or a sport utility vehicle. The vehicle may be configured for operation on both paved and rough, off-road terrain. As such, the suspension system may be correspondingly configured to support the weight of the vehicle while providing comfortable ride quality on both paved and rough, off-road terrain. In some embodiments, the suspension system is configured to change the ride height of the vehicle by lifting or lowering the body of the vehicle with respect to the ground.

Figure 1:
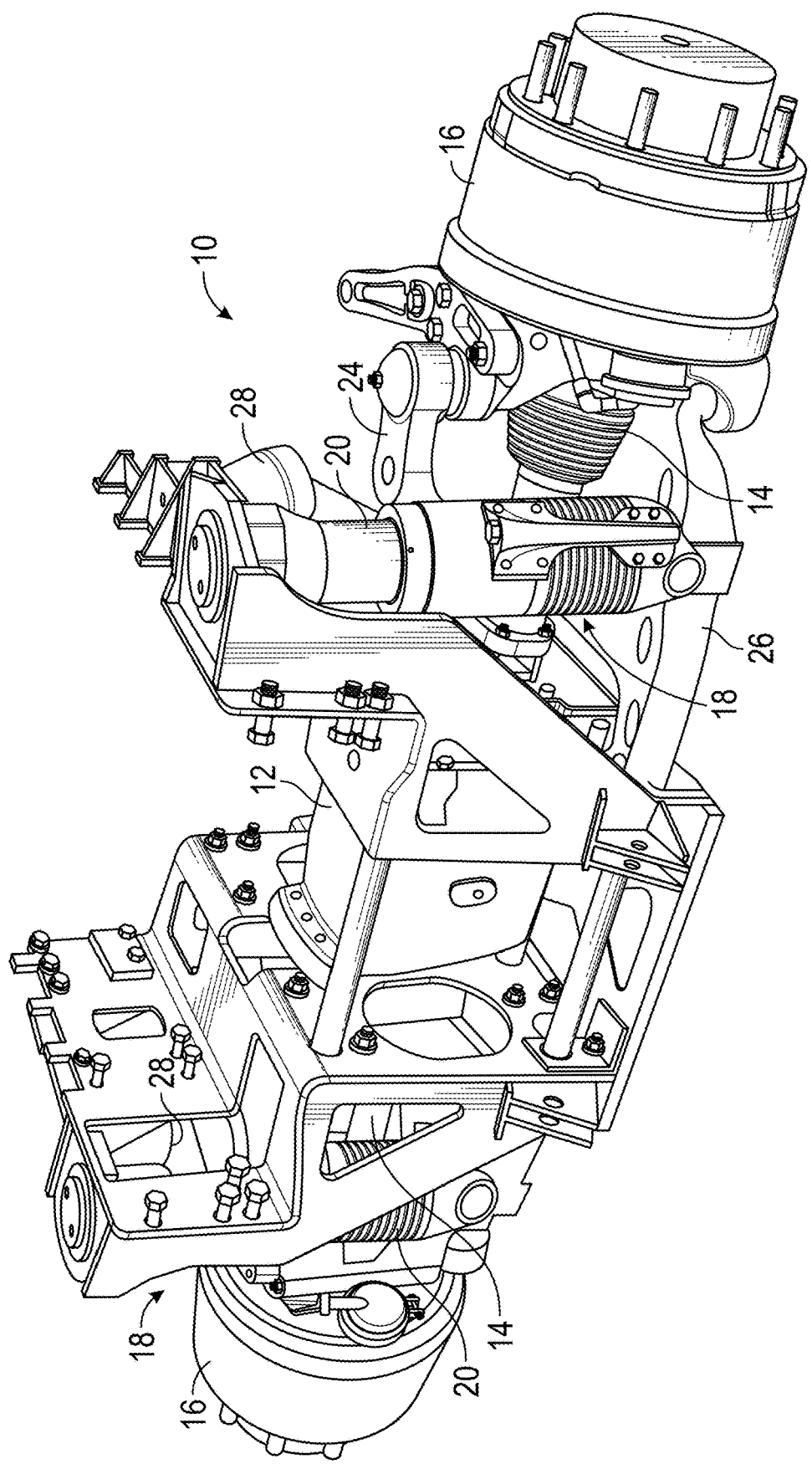
FIGS. 1-2 are perspective views of axle assemblies, according to alternative embodiments.
Figure 2:
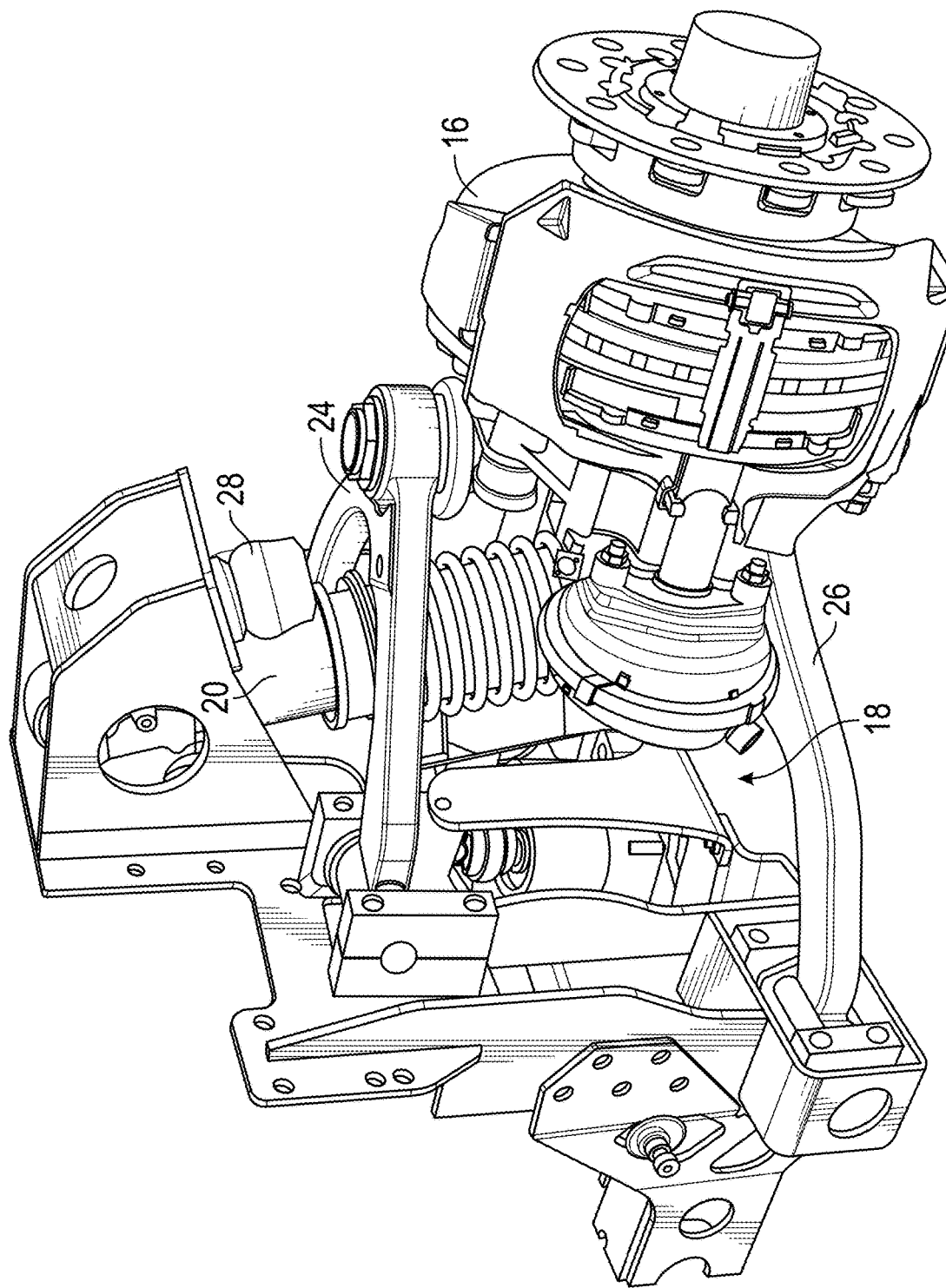

Referring to FIGS. 1-2, an axle assembly is configured for use with the vehicle. According to the exemplary embodiment shown in FIG. 1, an axle assembly 10 includes a differential 12 connected to half shafts 14, which are each connected to a wheel end assembly 16. As shown in FIG. 2, wheel end assembly 16 is not connected to a differential 12 by a half shaft 14. As shown in FIGS. 1-2, the wheel end assembly 16 is at least partially controlled (e.g., supported) by a suspension system 18, which includes a suspension element, shown as integrated spring damper 20, an upper support arm 24, and a lower support arm 26 coupling the wheel end assembly 16 to the vehicle body or part thereof (e.g., chassis, side plate, hull, etc.). As shown in FIGS. 1-2, suspension system 18 including integrated spring damper 20 may be implemented on a driven axle or a non-driven axle of a vehicle (e.g., an axle that includes or does not include a differential, half shaft, drive motor, or other component configured to provide a motive force, etc.).

According to an exemplary embodiment, the differential 12 is configured to be connected with a drive shaft of the vehicle, receiving rotational energy from a prime mover of the vehicle, such as a diesel engine. The differential 12 allocates torque provided by the prime mover between half shafts 14 of the axle assembly 10. The half shafts 14 deliver the rotational energy to the wheel end assemblies 16 of the axle assembly 10. The wheel end assemblies 16 may include brakes (e.g., disc brakes, drum brakes, etc.), gear reductions, steering components, wheel hubs, wheels, and other features. As shown in FIG. 2, the wheel end assemblies 16 include disc brakes. As the vehicle travels over uneven terrain, the upper and lower support arms 24, 26 at least partially guide the movement of each wheel end assembly 16, and a stopper 28 provides an upper bound for movement of the wheel end assembly 16.

The integrated spring damper 20 is configured to provide both the functionality of a gas spring and the damping functionality of a hydraulic damper. The integrated spring damper 20 allows the ride height of the suspension to be raised or lowered (e.g., a kneel function). The integrated spring damper 20 is smaller and a more robust package than a typical gas spring. The integrated spring damper 20 also utilizes less hydraulic fluid than traditional dampers, provides increased damping control, and offers increased service life.

According to the exemplary embodiment shown in FIGS. 3A-3B, an integrated spring damper 100 is configured to act as a damper (e.g., a hydraulic damper) and a spring (e.g., a high pressure gas spring). The integrated spring damper 100 includes a main body 102 (e.g., cylinder, housing, base, etc.). In one embodiment, main body 102 is tubular. The ends of the main body 102 are closed by a cap 104 and a barrier 106 to define an internal volume. The internal volume of the main body 102 is separated into a central chamber and an annular, outer chamber by an inner tube 110 that extends from the cap 104 to the barrier 106. The end of the inner tube 110 proximate to the barrier 106 is closed with a cap 112. The cap 112 may be generally aligned with the barrier 106 (e.g., received in a central opening 114 in the barrier 106). The integrated spring damper 100 further includes a tubular (e.g., cylindrical, etc.) second body, shown as main tube 116. In one embodiment, main tube 116 is tubular and defines an inner volume. The main tube 116 is received in the annular chamber of the internal volume of the main body 102. The main tube 116 is configured to translate with respect to the main body 102. According to an exemplary embodiment, the main tube 116 has an inner diameter that is approximately equal to the outer diameter of the inner tube 110 such that the inner tube 110 is received in the main tube 116 when the main tube 116 is disposed within the internal volume of the main body 102. The distal end of the main tube 116 is closed by a cap 118. The cap 104, barrier 106, cap 112, and cap 118 may be coupled to the respective components with a threaded connection or with another coupling mechanism (e.g., welding, brazing, interference fit, etc.).

According to an exemplary embodiment, the integrated spring damper 100 includes a first eyelet 120 and a second eyelet 122 with which the integrated spring damper 100 is coupled to an axle assembly. According to an exemplary embodiment, the integrated spring damper 100 is coupled on one end (e.g., via the first eyelet 120) to a moveable member of the axle assembly (e.g., an upper support arm, a lower support arm, etc.) and on the other end (e.g., via the second eyelet 122) to the vehicle body or part thereof (e.g., chassis, side plate, hull). According to an exemplary embodiment, the first eyelet 120 and the second eyelet are integrally formed with the cap 104 and the cap 118, respectively.

A main piston 124 is disposed in the outer annular chamber defined between the main body 102 and the inner tube 110. The main piston 124 is coupled to the main tube 116 and extends to an inner surface of the main body 102. The main piston 124 separates the outer annular chamber into first annular chamber 126 and a second annular chamber 128. When the main tube 116 translates relative to the main body 102, the main piston 124 changes the volume of the first annular chamber 126 and the second annular chamber 128. A dividing piston 130 (e.g., floating piston) is disposed in the inner chamber defined by the inner tube 110. The dividing piston 130 slidably engages the inner tube 110. The dividing piston 130 separates the inner chamber into first inner chamber 132 and a second inner chamber 134. The pistons 124 and 130 may be coupled to the sidewalls of the main body 102 and the inner tube 110 with a seal or other interfacing member (e.g., ring, wear band, guide ring, wear ring, etc.).

The first annular chamber 126, the second annular chamber 128, and the first inner chamber 132 contain a generally non-compressible fluid. In one embodiment, the first annular chamber 126, the second annular chamber 128, and the first inner chamber 132 are hydraulic chambers configured to contain a hydraulic fluid therein (e.g., water, hydraulic oil, etc.). The first inner chamber 132 is in fluid communication with the first annular chamber 126 through apertures 136 in the inner tube 110. The fluid may flow between the first annular chamber 126 and the second annular chamber 128 through a passage 142 (e.g., conduit, bore, etc.) in a bypass manifold 140. According to an exemplary embodiment, the bypass manifold 140 is a structure coupled (e.g., bolted) to the side of the main body 102 and the passage 142 is in fluid communication with the first annular chamber 126 through an aperture 144 in the main body 102 and with the second annular chamber 128 through an aperture 146 in the main body 102. Providing the bypass manifold 140 as a separate component coupled to the exterior of the main body 102 allows the bypass manifold 140 to be replaced to vary the behavior of the integrated spring damper 100, such as by changing the valving or adding optional features (e.g., position dependency).

The flow of fluid through the passage 142 is controlled by a flow control device 148. According to an exemplary embodiment, the flow control device 148 is a disk valve disposed within the bypass manifold 140 along the passage 142. In other embodiments, the flow control device 148 may be another device, such as a pop off valve, or an orifice. In other embodiments, the flow control device remotely positioned but in fluid communication with the first annular chamber 126 and the second annular chamber 128.

The second inner chamber 134 contains a generally compressible fluid that may include (e.g., at least 90%, at least 95%) an inert gas such as nitrogen, argon, or helium, among others. The second inner chamber 134 is in fluid communication with the internal volume 150 of the main tube 116 through apertures 152 in the cap 112. In some embodiments, the internal volume 150 of the main tube 116 is in fluid communication with external devices, such as one or more reservoirs (e.g., central reservoir, tank), an accumulator, or device allowing the pressure of the gas to be adjusted. The pressure of the gas may be adjusted by removing or adding a volume of gas to adjust the suspension ride height.

When the integrated spring damper 100 is compressed or extended, the main tube 116 translates relative to the main body 102. The gas held in the second inner chamber 134 compresses or expands in response to relative movement between the main tube 116 and the dividing piston 130, which may remain relatively stationary but transmit pressure variations between the incompressible hydraulic fluid in the first inner chamber 132 and the compressible fluid in second inner chamber 134. The gas in the second inner chamber 134 resists compression, providing a force that is a function of the compressibility of the gas, the area of the piston, the volume and geometry of the chamber, and the current state (e.g., initial pressure) of the gas, among other factors. The receipt of potential energy as the gas is compressed, storage of potential energy, and release of potential energy as the gas expands provide a spring function for the integrated spring damper 100.

Movement of the main tube 116 relative to the main body 102 translates the main piston 124, causing the volume of the first annular chamber 126 and the second annular chamber 128 to vary. When the integrated spring damper 100 compresses, the volume of the first annular chamber 126 decreases while the volume of the second annular chamber 128 increases. The fluid is forced from the first annular chamber 126 through the passage 142 and past the flow control device 148 into the second annular chamber 128. The resistance to the flow of the fluid through the passage provides a damping function for the integrated spring damper 100 that is independent of the spring function. Movement of the main piston 124 also changes the pressure of the fluid within first inner chamber 132. Such pressure variation imparts a force on a first side of the dividing piston 130 that varies the pressure of the fluid within the second inner chamber 134.

Figure 4:
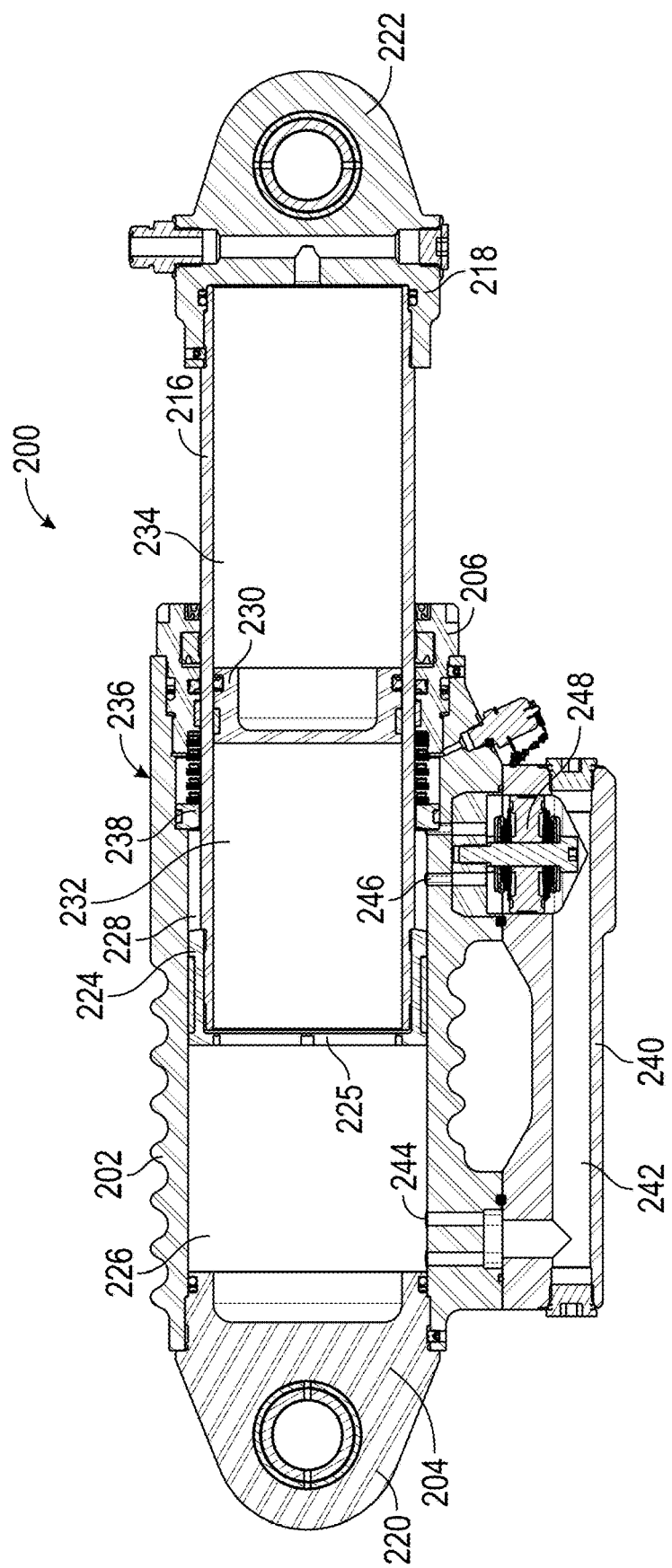
FIG. 4 is a sectional view of a suspension element, according to an alternative embodiment.

Referring to FIG. 4, an integrated spring damper 200 is shown, according to another exemplary embodiment. The integrated spring damper 200 includes a tubular (e.g., cylindrical, etc.) main body 202 (e.g., cylinder, housing, base, etc.). The ends of the main body 202 are closed by a cap 204 and a barrier 206 to define an internal volume. The integrated spring damper 200 further includes a tubular (e.g., cylindrical, etc.) main tube 216. The main tube 216 is received in the internal volume of the main body 202. The main tube 216 is configured to translate with respect to the main body 202. The distal end of the main tube 216 is closed by a cap 218. The cap 204, barrier 206, and cap 218 may be coupled to the respective components with a threaded connection or with another coupling mechanism (e.g., welding, brazing, interference fit, etc.).

According to an exemplary embodiment, the integrated spring damper 200 includes a first eyelet 220 and a second eyelet 222 with which the integrated spring damper 200 is coupled to an axle assembly. According to an exemplary embodiment, the integrated spring damper 200 is coupled on one end (e.g., via the first eyelet 220) to a moveable member of the axle assembly (e.g., an upper support arm, a lower support arm, etc.) and on the other end (e.g., via the second eyelet 222) to the vehicle body or part thereof (e.g., chassis, side plate, hull). According to an exemplary embodiment, the first eyelet 220 and the second eyelet 222 are integrally formed with the cap 204 and the cap 218, respectively.

A main piston 224 is disposed in the internal volume of the main body 202. The main piston 224 is coupled to the main tube 216 and slidably engages the main body 202. The main piston 224 separates the internal volume into a first chamber 226 (e.g., compression chamber) and a second chamber 228 (e.g., extension chamber). The first chamber 226 is a generally cylindrical chamber comprising the portion of the internal volume of the main body 202 between the main piston 224 and the cap 204. The second chamber 228 is an annular chamber defined between the main body 202 and the main tube 216 and extends between the main piston 224 and the barrier 206. When the main tube 216 translates relative to the main body 202, the main piston 224 changes the volume of the first chamber 226 and the second chamber 228. A dividing piston 230 (e.g., floating piston) is disposed in the main tube 216 and slidably engages the main tube 216. The dividing piston 230 separates the internal volume of the main tube 216 into the first inner chamber 232 and a second inner chamber 234. According to an exemplary embodiment, the first inner chamber 232 is open to (i.e., in fluid communication with) the first chamber 226.

A limiter, shown as recoil damper 236, is disposed within the internal volume of the main body 202 between the main piston 224 and the barrier 206. The recoil damper 236 is intended to reduce the risk of damage to the main piston 224, barrier 206, the sidewall of main body 202, or still another component of integrated spring damper 200 by reducing the forces imparted by the main piston 224 as it travels toward an end of stroke. According to an exemplary embodiment, the recoil damper 236 includes a recoil piston 238 positioned within the second chamber 228 and a resilient member such as an interlaced wave spring (i.e., a flat wire compression spring), a coil spring, or another type of spring. The resilient member may be disposed between the recoil piston 238 and the barrier 206. According to an exemplary embodiment, the resilient member is not intended to damp the movement of the main piston 224 but positions the recoil piston 238 within the main body 202, such as after it has been displaced by the main piston 224. In other embodiments, the recoil damper 236 may not include a resilient member and the recoil piston 238 may be repositioned using gravity or an alternative device.

Occupants within a vehicle experience large impulse forces as the main piston 224 contacts the barrier 206 or a component of the suspension system engages a hard stop. The recoil damper 236 reduces such impulse forces transmitted to occupants within the vehicle by dissipating a portion of the kinetic energy of the main piston 224 and the main tube 216 (i.e. provide a supplemental damping force) as the integrated spring damper 200 reaches an end of stroke (e.g., as the piston reaches a recoil end of stroke, as the piston reaches a jounce end of stroke, etc.).

The first chamber 226, the second chamber 228, and the first inner chamber 232 contain a generally non-compressible fluid (e.g., hydraulic fluid, oil, etc.). The first inner chamber 232 is in fluid communication with the first chamber 226 through an opening 225 in the main piston 224. The fluid may flow between the first chamber 226 and the second chamber 228 through a passage 242 (e.g., conduit, bore, etc.) in a bypass manifold 240. According to an exemplary embodiment, the bypass manifold 240 is a structure coupled to the side of the main body 202. The passage 242 is in fluid communication with the first chamber 226 through an aperture 244 in the main body 202 and with the second chamber 228 through an aperture 246 in the main body 202. According to an exemplary embodiment, the aperture 246 opens into the second chamber 228 between the main piston 224 and the recoil piston 238. The flow of fluid through the passage 242 is controlled by a flow control device 248. According to an exemplary embodiment, the flow control device 248 is a disk valve disposed within the bypass manifold 240 along the passage 242. In other embodiments, the flow control device 248 may be another device, such as a pop off valve, or an orifice. In other embodiments, the flow control device remotely positioned but in fluid communication with the first chamber 226 and the second chamber 228.

The second inner chamber 234 contains a generally compressible fluid that may include (e.g., at least 90%, at least 95%) an inert gas such as nitrogen, argon, or helium, among others. In some embodiments, the second inner chamber 234 is in fluid communication with external devices, such as one or more reservoirs (e.g., central reservoir, tank), an accumulator, or device allowing the pressure of the gas to be adjusted. The pressure of the gas may be adjusted by removing or adding a volume of gas to adjust the suspension ride height.

When the integrated spring damper 200 is compressed or extended, the main tube 216 translates relative to the main body 202. The gas held in the second inner chamber 234 compresses or expands in response to relative movement between the main tube 216 and the dividing piston 230, which may remain relatively stationary but transmit pressure variations between the incompressible hydraulic fluid in the first inner chamber 232 and the compressible fluid in second inner chamber 234. The gas in the second inner chamber 234 resists compression, providing a force that is a function of the compressibility of the gas, the area of the piston, the volume and geometry of the chamber, and the current state (e.g., initial pressure) of the gas, among other factors. The receipt of potential energy as the gas is compressed, storage of potential energy, and release of potential energy as the gas expands provide a spring function for the integrated spring damper 200.

Movement of the main tube 216 relative to the main body 202 translates the main piston 224, causing the volume of the first chamber 226 and the second chamber 228 to vary. When the integrated spring damper 200 compresses, the volume of the first chamber 226 decreases while the volume of the second chamber 228 increases. The fluid is forced from the first chamber 226 through the passage 242 and past the flow control device 248 into the second chamber 228. The resistance to the flow of the fluid through the passage 242 provides a damping function for the integrated spring damper 200 that is independent of the spring function.

Figure 5:
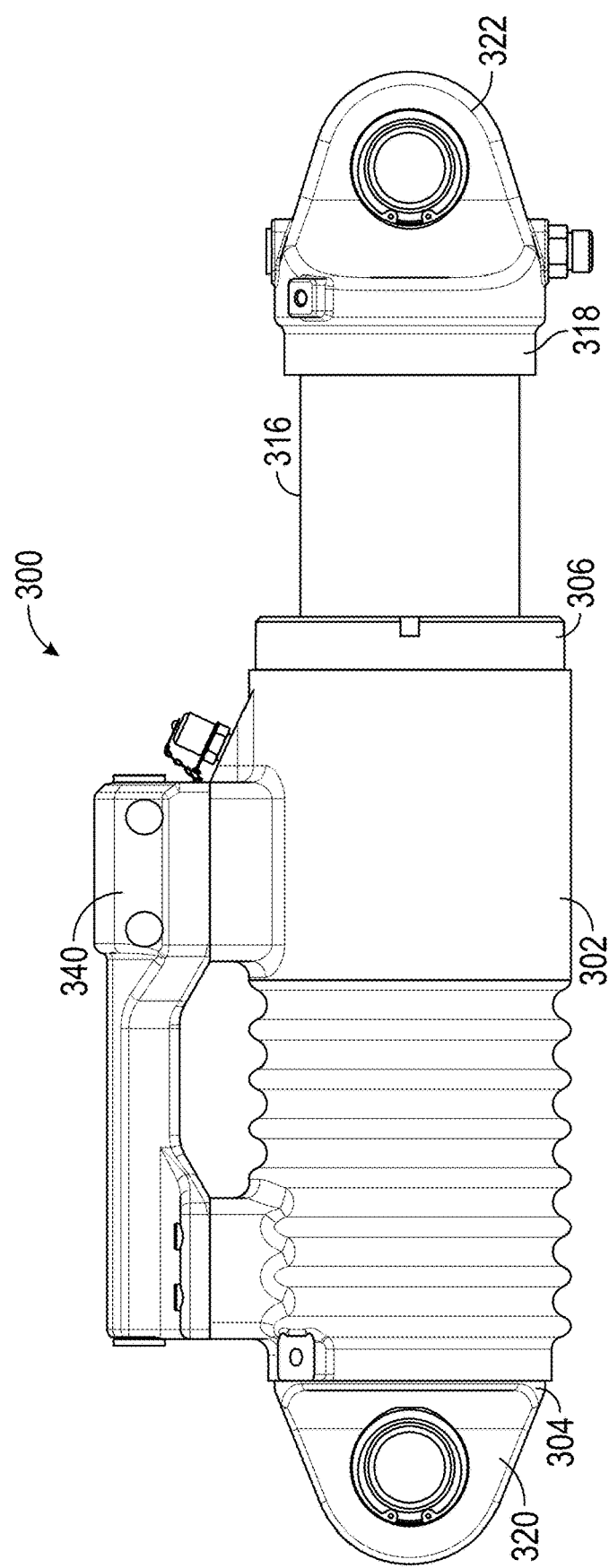
FIG. 5 is side view of a suspension element, according to an alternative embodiment.
Figure 6:
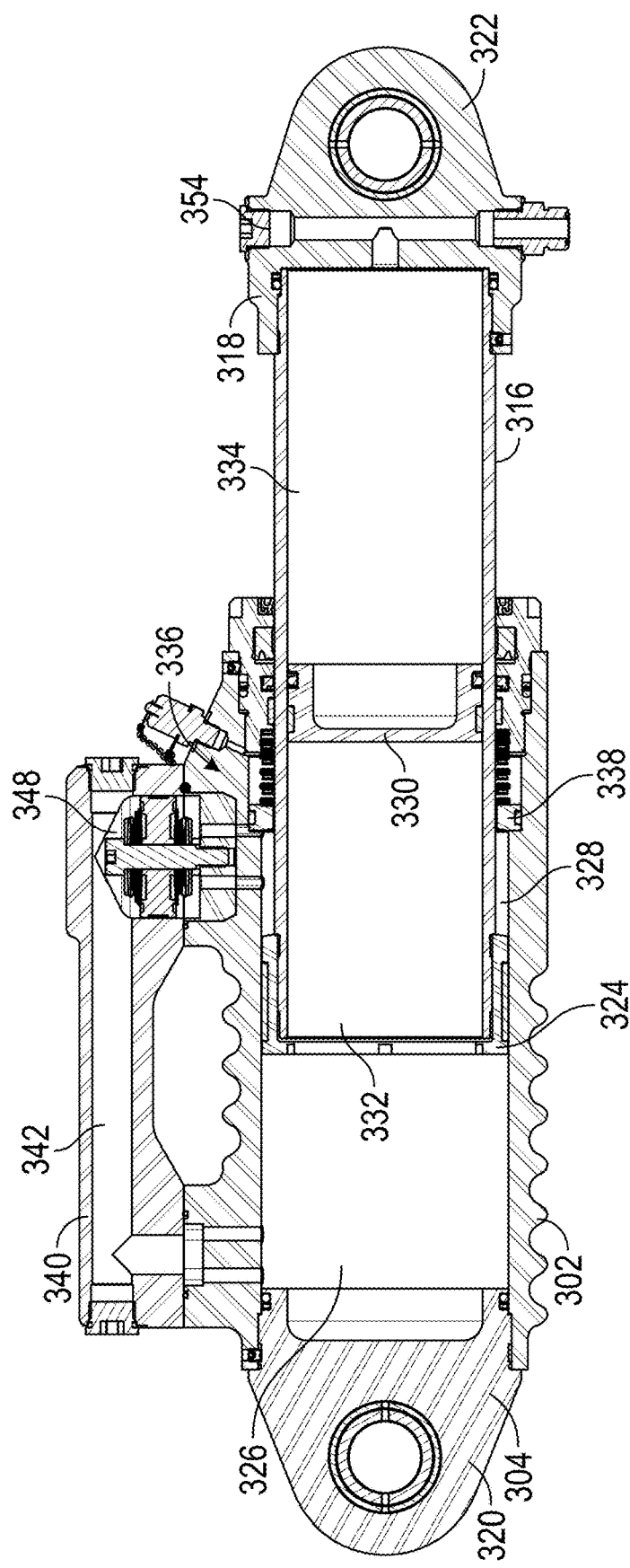
FIG. 6 is a sectional view of the suspension element of FIG. 5.
Figure 7:
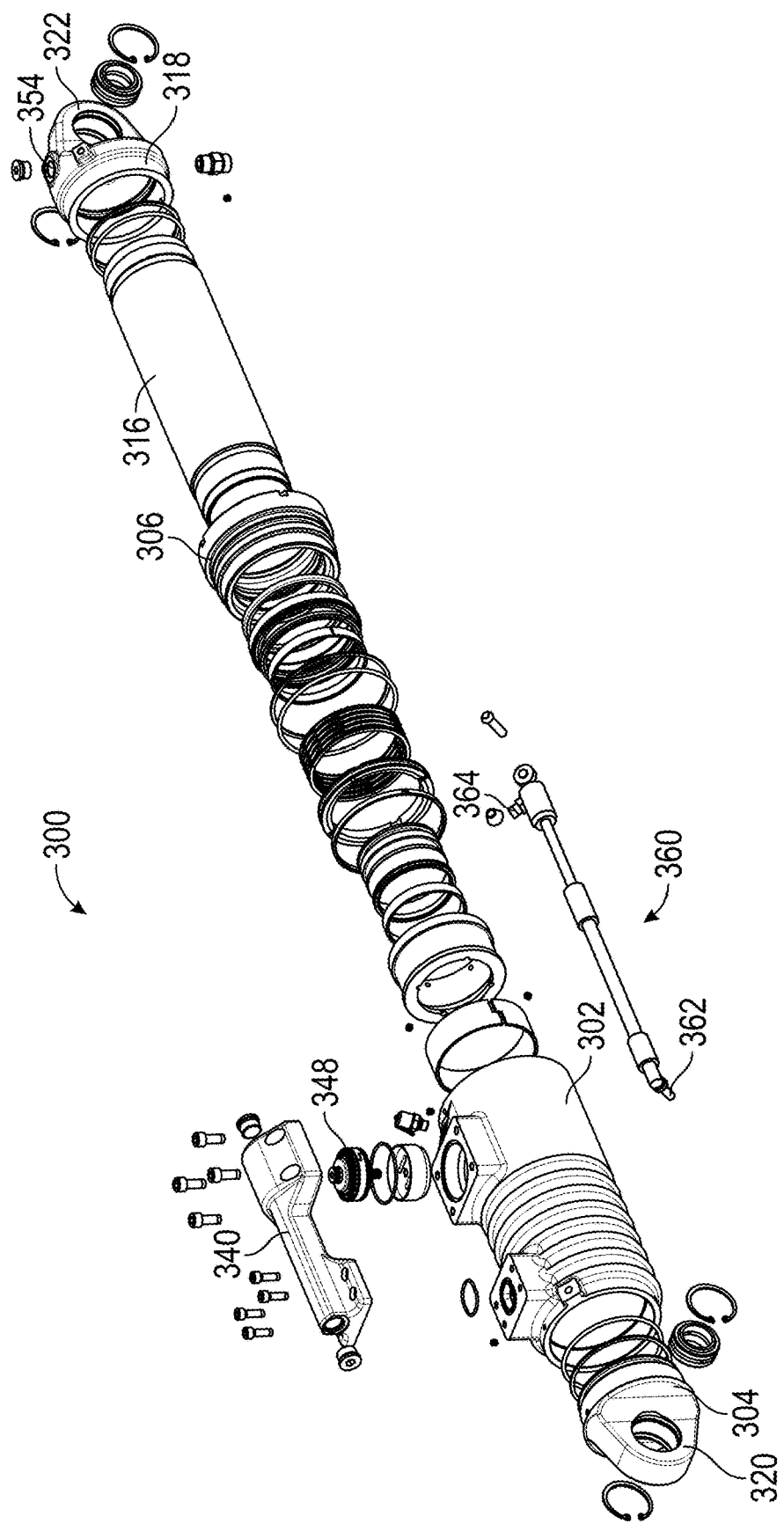
FIG. 7 is an exploded view of the suspension element of FIG. 5.

Referring to FIGS. 5-7, an integrated spring damper 300 is shown, according to another exemplary embodiment. The integrated spring damper 300 is similar in construction and function to the integrated spring damper 200.

As shown in FIG. 5, the integrated spring damper 300 includes a tubular (e.g., cylindrical, etc.) main body 302 (e.g., cylinder, housing, base, etc.). The ends of the main body 302 are closed by a cap 304 and a barrier 306 to define an internal volume. The integrated spring damper 300 further includes a tubular (e.g., cylindrical, etc.) main tube 316. The main tube 316 is received in the internal volume of the main body 302. The main tube 316 is configured to translate with respect to the main body 302. The distal end of the main tube 316 is closed by a cap 318. The integrated spring damper 300 includes a first eyelet 320 and a second eyelet 322 with which the integrated spring damper 300 is coupled to an axle assembly.

As shown in FIG. 6, a main piston 324 is disposed in the internal volume of the main body 302 and separates the internal volume into a first chamber 326 (e.g., compression chamber) and a second chamber 328 (e.g., extension chamber). A dividing piston 330 (e.g., floating piston) is disposed in the main tube 316 and separates the internal volume of the main tube 316 into first inner chamber 332 and a second inner chamber 334. First inner chamber 332 is open to (i.e., in fluid communication) first chamber 326, according to an exemplary embodiment. A recoil damper 336 including a recoil piston 338 is disposed within the internal volume of the main body 302 between the main piston 324 and the barrier 306. A bypass manifold 340 is coupled to the side of the main body 302 and includes a passage 342 through which hydraulic fluid may pass between the first chamber 326 and the second chamber 328, and a flow control device 348 is disposed within the bypass manifold 340 along the passage 342. The second inner chamber 334 may be in fluid communication with external devices, such as one or more reservoirs (e.g., central reservoir, tank), an accumulator, or device allowing the pressure of the gas to be adjusted. The pressure of the gas may be adjusted by removing or adding a volume of gas to adjust the suspension ride height.

As shown in FIG. 7, the integrated spring damper 300 includes a sensor, shown as ride height sensor 360. The ride height sensor 360 includes a first end 362 and a second end 364. According to an exemplary embodiment, the ride height sensor 360 is coupled to the exterior of the integrated spring damper 300, with the first end 362 coupled to the main body 302 and the second end 364 coupled to the cap 318. The ride height sensor 360 is configured to have a relatively low profile such that it protrudes a minimal distance from the main body 302. The low profile of the ride height sensor 360 reduces the risk of interference with other components of the axle assembly. The ride height sensor 360 is configured to detect the displacement of the second end 364 relative to the first end 362 and output a signal dependent on the displacement. The displacement may be detected, for example, with a potentiometer (e.g., a rotary potentiometer) that provides a variable output voltage to a control system. The output signal may be utilized by the control system to determine the relative extension or compression of the integrated spring damper 300 and thereby the ride height of the vehicle with respect to the ground. A control system may use the signal (e.g., as feedback) to change the ride height of the vehicle by supplying a gas to or removing a gas from the second inner chamber 334 (e.g., through an aperture 354 from a gas reservoir).

Referring next to FIGS. 8A-8B, an integrated spring damper 400 is shown, according to another exemplary embodiment. The integrated spring damper 400 is similar in construction and function to the integrated spring damper 100. The integrated spring damper 400 includes a tubular (e.g., cylindrical, etc.) main body 402 (e.g., cylinder, housing, base, etc.). The ends of the main body 402 are closed by a cap 404 and a barrier 406 to define an internal volume that is separated into a central chamber and an annular, outer chamber by an inner tube 410. The end of the inner tube 410 proximate to the barrier 406 is closed with a cap 412. The integrated spring damper 400 further includes a tubular (e.g., cylindrical, etc.) main tube 416. The main tube 416 is received in the internal volume of the main body 402. The main tube 416 is configured to translate with respect to the main body 402. The distal end of the main tube 416 is closed by a cap 418. The integrated spring damper 400 includes a first eyelet 420 and a second eyelet 422 with which the integrated spring damper 400 is coupled to an axle assembly.

A main piston 424 is disposed in an outer annular chamber defined between the main body 402 and the inner tube 410 and separates the outer annular chamber into first annular chamber 426 and a second annular chamber 428. A dividing piston 430 (e.g., floating piston) is disposed in the inner chamber defined by the inner tube 410 and separates the inner chamber into first inner chamber 432 and a second inner chamber 434. According to an exemplary embodiment, the first inner chamber 432 is in fluid communication with first annular chamber 426.

A bypass manifold 440 is coupled to the side of the main body 402 and includes a passage 442 through which hydraulic fluid may pass between the first annular chamber 426 and the second annular chamber 428. A flow control device 448 is disposed within the bypass manifold 440 along the passage 442. The second inner chamber 434 may be in fluid communication with external devices, such as one or more reservoirs (e.g., central reservoir, tank), an accumulator, or device allowing the pressure of the gas to be adjusted. The pressure of the gas may be adjusted by removing or adding a volume of gas to adjust the suspension ride height.

The integrated spring damper 400 includes a sensor, shown as ride height sensor 460. The ride height sensor 460 includes a first end 462 and a second end 464. According to the exemplary embodiment shown in FIG. 8B, the ride height sensor 460 is positioned in the interior of the integrated spring damper 400 with the first end 462 coupled to the cap 404 and the second end 464 coupled to the cap 418. The ride height sensor 460 extends through openings in the cap 412 and the dividing piston 430. Positioning the ride height sensor 460 in the interior of the integrated spring damper 400 reduces the risk of interference with other components of the axle assembly. According to the exemplary embodiment shown in FIGS. 8A-8B, the ride height sensor 460 is generally centrally positioned (e.g., along a center line, coaxial, etc.) within the interior of the main tube 416. In other embodiments, the ride height sensor 460 may be offset to one side of the integrated spring damper 400.

Figure 9A:
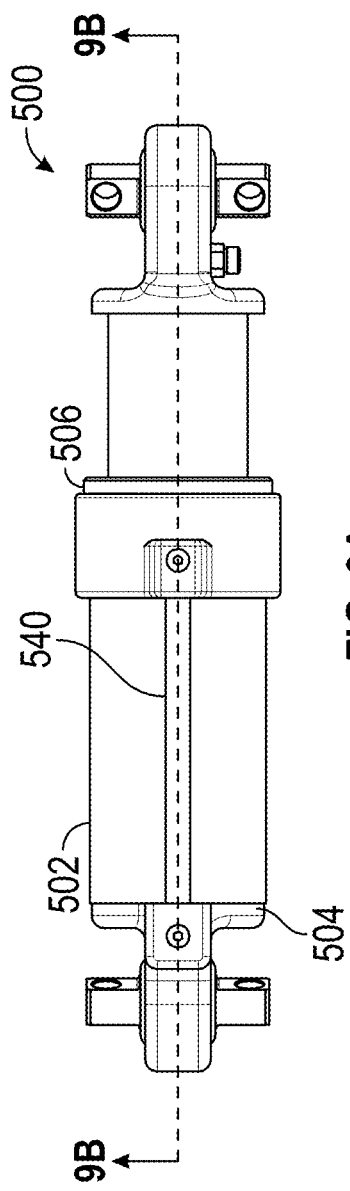
FIG. 9A is a side view of a suspension element, according to an alternative embodiment.
Figure 9B:
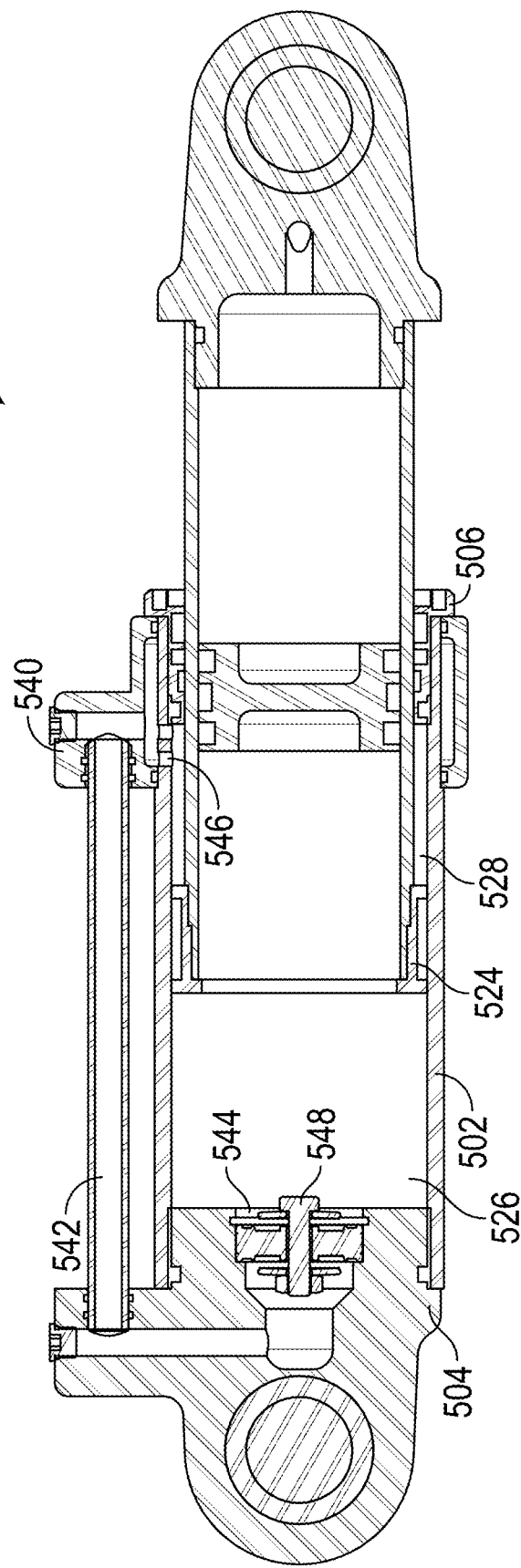
FIG. 9B is a sectional view of the suspension element of FIG. 9A.

Referring next to FIGS. 9A-9B, an integrated spring damper 500 is shown, according to another exemplary embodiment. The integrated spring damper 500 is similar in construction and function to the integrated spring damper 200. The integrated spring damper 500 includes a tubular (e.g., cylindrical, etc.) main body 502 (e.g., cylinder, housing, base, etc.). The ends of the main body 502 are closed by a cap 504 and a barrier 506 to define an internal volume. A main piston 524 is disposed in the internal volume of the main body 502 and separates the internal volume into a first chamber 526 and a second chamber 528. A bypass manifold 540 includes a passage 542 through which hydraulic fluid may pass between the first chamber 526 and the second chamber 528 and a flow control device 548 disposed within the cap 504 along the passage 542.

The passage 542 of the bypass manifold 540 opens into the second chamber 528 through an aperture 546 in the main body 502 (e.g., the sidewall of the chambers 526 and 528). The passage 542 extends through the body of the cap 504 and opens into the first chamber 526 through an aperture 544 provided in the cap 504 (e.g., the end wall of the first chamber 526). By providing the aperture 544 at the end of the first chamber 526 rather than along the sidewall of the first chamber 526, the stroke length of the integrated spring damper 500 is increased and the dead length (e.g., the difference between the stroke length and the total length of the integrated spring damper 500) is reduced.

Referring next to FIGS. 10A-10B, an integrated spring damper 600 is shown, according to another exemplary embodiment. The integrated spring damper 600 is similar in construction and function to the integrated spring damper 100. The integrated spring damper 600 includes a tubular (e.g., cylindrical, etc.) main body 602 (e.g., cylinder, housing, base, etc.). The ends of the main body 602 are closed by a cap 604 and a barrier 606 to define an internal volume that is separated into a central chamber and an annular, outer chamber by an inner tube 610. The end of the inner tube 610 proximate to the barrier 606 is closed with a cap 612. The integrated spring damper 600 further includes a tubular (e.g., cylindrical, etc.) main tube 616. The main tube 616 is received in the internal volume of the main body 602. The main tube 616 is configured to translate with respect to the main body 602. The distal end of the main tube 616 is closed by a cap 618. The integrated spring damper 600 includes a first eyelet 620 and a second eyelet 622 with which the integrated spring damper 600 is coupled to an axle assembly.

A main piston 624 is disposed in an outer annular chamber defined between the main body 602 and the inner tube 610 and separates the outer annular chamber into first annular chamber 626 and a second annular chamber 628. A dividing piston 630 (e.g., floating piston) is disposed in the inner chamber defined by the inner tube 610 and separates the inner chamber into a first inner chamber 632 and a second inner chamber 634. The first inner chamber 632 is in fluid communication with the first annular chamber 626 through one or more apertures 636 in the inner tube 610, and second inner chamber 634 is in fluid communication with a chamber between cap 612 and cap 618 via apertures in the cap 612.

A bypass manifold 640 includes a passage 642 through which hydraulic fluid may pass between the first inner chamber 632 and the second annular chamber 628 and a flow control device 648 disposed within the cap 604 along the passage 642. The passage 642 of the bypass manifold 640 opens into the first inner chamber 632 through an aperture 644 in the cap 604 and into the second annular chamber 628 through an aperture 646 in the main body 602. The passage 642 extends through the body of the cap 604 and opens into the first inner chamber 632 through an aperture 646 provided in the cap 604.

The integrated spring damper 600 additionally includes a sensor, shown as ride height sensor 660. The ride height sensor 660 includes a first end 662 and a second end 664. According to an exemplary embodiment, the ride height sensor 660 is positioned in the interior of the integrated spring damper 600 with the first end 662 passing through the flow control device 648 and coupled to the cap 604 and the second end 664 coupled to the cap 618. The ride height sensor 660 extends through openings in the cap 612 and the dividing piston 630.

Referring to FIGS. 11A-11B, an integrated spring damper 700 is shown, according to another exemplary embodiment. The integrated spring damper 700 is similar in construction and function to the integrated spring damper 600. The integrated spring damper 700 includes a bypass manifold 740. The bypass manifold 740 defines a passage 742 through which hydraulic fluid may pass between a first inner chamber 732 and a second annular chamber 728, and a flow control device 748 is disposed within the bypass manifold 740 along the passage 742. The passage 742 includes one or more end portions 745 formed in a cap 704 and an annular portion 747 between a main body 702 and an outer wall and extending from the cap 704 to a barrier 706. The passage 742 is in fluid communication with a first inner chamber 732 through an aperture 744 in the cap 704 and with a second annular chamber 728 through one or more apertures 746 in the main body 702.

Figures 12A, 12B:
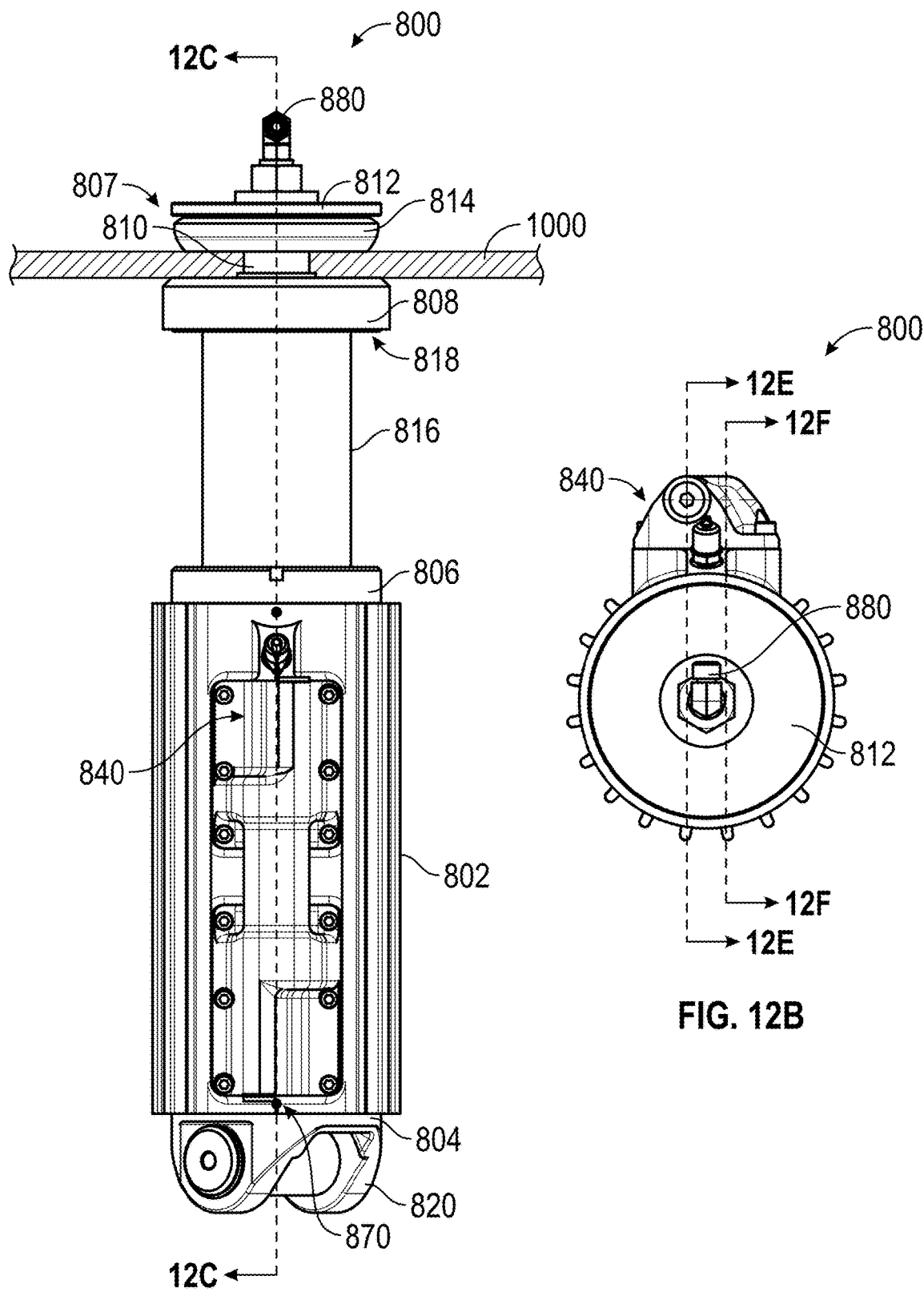
FIG. 12A is a side view of an suspension element, according to an alternative embodiment.
FIG. 12B is a top view of the suspension element of FIG. 12A.
Figure 12C:
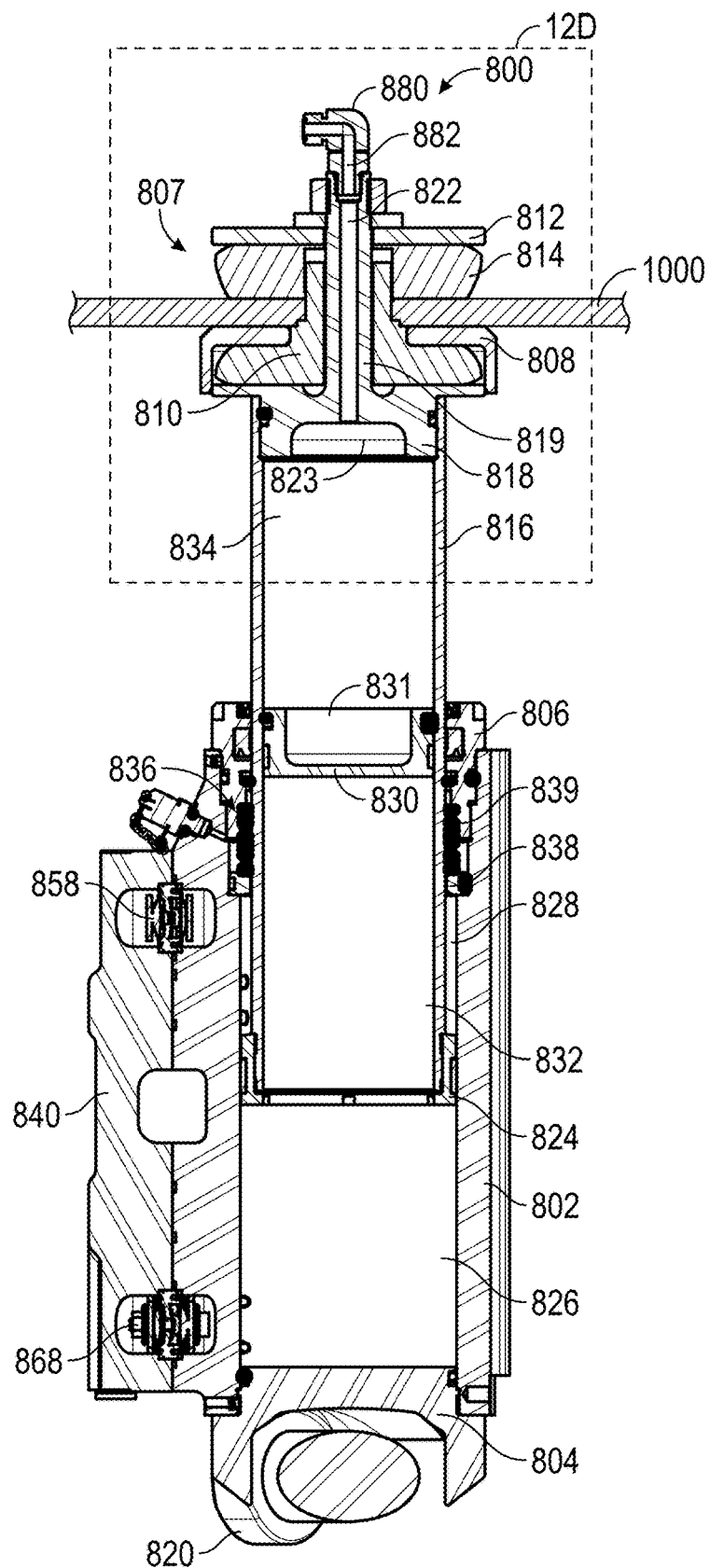
FIG. 12C is a sectional view of the suspension element of FIG. 12A.

Referring to FIGS. 12A-12F, an integrated spring damper 800 is shown, according to another exemplary embodiment. As shown in FIG. 12A, the integrated spring damper 800 includes a tubular (e.g., cylindrical, etc.) main body (e.g., cylinder, housing, base, etc.), shown as main body 802. In one embodiment, the main body 802 is manufactured using an extrusion process. In an alternative embodiment, the main body 802 is manufactured using a casting process. As shown in FIGS. 12A and 12C, a cap, shown as cap 804, and a barrier, shown as barrier 806, are disposed on opposing ends of the main body 802, defining an internal volume. The integrated spring damper 800 further includes a tubular (e.g., cylindrical, etc.) element, shown as main tube 816. The main tube 816 is at least partially received within the internal volume of the main body 802. The main tube 816 is configured to translate with respect to the main body 802. As shown in FIG. 12C, a cap, shown as cap 818, is disposed at a distal end of the main tube 816. The cap 804, barrier 806, and cap 818 may be coupled to the respective components with a threaded connection or with another coupling mechanism (e.g., welding, a friction weld, brazing, interference fit, etc.). As shown in FIG. 12A, in some embodiments, the integrated spring damper 800 includes a locking mechanism, shown as locking mechanism 870. In one embodiment, the locking mechanism 870 is configured to position (e.g., lock, index, etc.) the cap 804 in a target orientation relative to the main body 802. In one embodiment, the locking mechanism 870 includes a set screw that is tightened to facilitate locking the cap 804 in the target orientation. The locking mechanism 870 may facilitate indexing a lower mount of the integrated spring damper 800 relative to other components thereof and thereby facilitate mounting integrated spring damper 800 onto a vehicle.

According to an exemplary embodiment, the integrated spring damper 800 includes a first mounting portion (e.g., a lower mounting portion, etc.), shown as eyelet 820, with which the integrated spring damper 800 is coupled to one portion of an axle assembly (e.g., a lower portion of the axle assembly, etc.). According to an exemplary embodiment, the integrated spring damper 800 is coupled on one end (e.g., via the eyelet 820 on a lower end, etc.) to a moveable member of the axle assembly (e.g., a lower support arm, etc.). According to an exemplary embodiment, the eyelet 820 is integrally formed with the cap 804. As shown in FIG. 12A, the integrated spring damper 800 includes a second mounting portion (e.g., an upper mounting portion, a pin mount, etc.), shown as upper mount 807. The upper mount 807 is configured to couple an opposing second end (e.g., an upper end, etc.) of the integrated spring damper 800 to a vehicle body, frame member, or part thereof (e.g., chassis, side plate, hull, etc.), shown as side plate 1000.

Figure 12D:
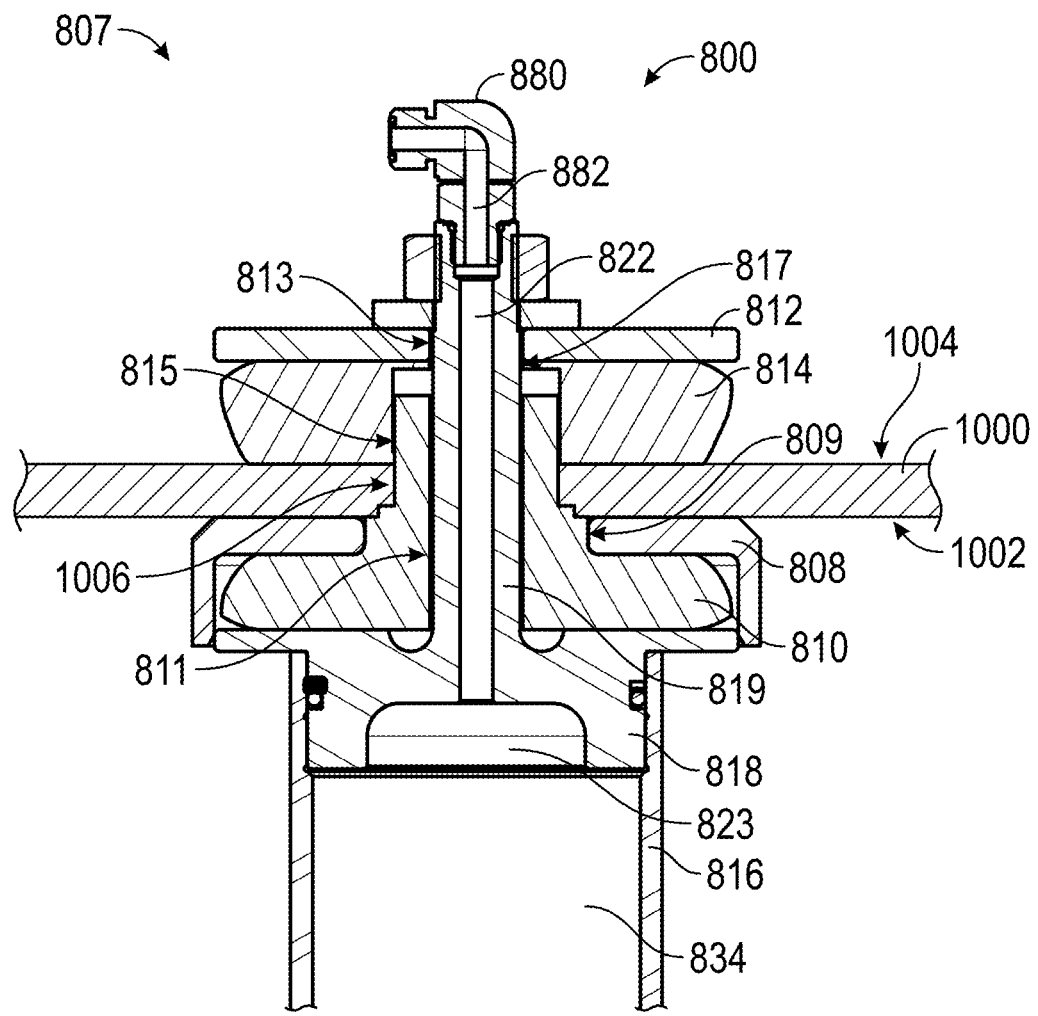
FIG. 12D is a detail view of an upper mount of the suspension element of FIG. 12C.

As shown in FIGS. 12A and 12C-12D, the upper mount 807 includes a first mounting member 808, a second mounting member 810, a third mounting member 812, and a fourth mounting member 814. As shown in FIGS. 12A and 12D, the first mounting member 808 is positioned such that a top surface of the first mounting member 808 abuts a first surface of the side plate 1000, shown as bottom surface 1002. In one embodiment, the first mounting member 808 is constructed from a metal or wear resistant material. As shown in FIG. 12C-12D, the second mounting member 810 includes a portion (e.g., a lower portion, a first portion, a non-protruded portion, etc.) that is positioned between the cap 818 and the first mounting member 808. In one embodiment, the second mounting member 810 is a resilient member, such as a flexible urethane, that serves as an isolator and an elastomeric spacer. The second mounting member 810 may be configured to isolate the cap 818 from at least one of the first mounting member 808 and the side plate 1000. In some embodiments, the first mounting member 808 and the second mounting member 810 are annular and circular in shape. In other embodiments, the first mounting member 808 and the second mounting member 810 have another shape (e.g., discus square, hexagonal, etc.).

As shown in FIGS. 12A and 12D, the fourth mounting member 814 is positioned between the side plate 1000 and the third mounting member 812. A second surface, shown as top surface 1004, of the side plate 1000 is in contact with a bottom surface of the fourth mounting member 814, and the third mounting member 812 is disposed on a top surface of the fourth mounting member 814. The first mounting member 808 and the fourth mounting member 814 are spaced to receive the side plate 1000. In one embodiment, the fourth mounting member 814 is a resilient member, such as a flexible urethane, that serves as an isolator and an elastomeric spacer. The fourth mounting member 814 may be configured to isolate the third mounting member 812 from the side plate 1000. In one embodiment, the third mounting member 812 is constructed from a metal or wear resistant material. In some embodiments, the third mounting member 812 and the fourth mounting member 814 are annular and circular in shape. In other embodiments, the third mounting member 812 and the fourth mounting member 814 have another shape (e.g., discus square, hexagonal, etc.).

As shown in FIG. 12D, the first mounting member 808 defines an aperture, shown as aperture 809, that corresponds with (e.g., aligns with, cooperates with, etc.) an aperture defined by side plate 1000, shown as side plate aperture 1006. The second mounting member 810 includes a protruded portion (e.g., a second portion, an upper portion, etc.)

that extends through the aperture 809 and the side plate aperture 1006 and engages with a recess, shown as recess 815, defined by the fourth mounting member 814. In one embodiment, the recess 815 receives the protruded portion of the second mounting member 810. The second mounting member 810 defines an aperture, shown as bore 811, that extends longitudinally through the second mounting member 810 and aligns with (e.g., cooperates with, etc.) an aperture, shown as aperture 813, and an aperture, shown as aperture 817, defined by the third mounting member 812 and the fourth mounting member 814, respectively. The bore 811, aperture 813, and aperture 817 receive a protruded portion 819 of the cap 818.

As shown in FIG. 12C, a main piston, shown as main piston 824, is disposed in the internal volume of the main body 802. The main piston 824 is coupled to the main tube 816 and slidably engages the main body 802. The main piston 824 separates the internal volume into a first chamber 826 (e.g., compression chamber, etc.) and a second chamber 828 (e.g., extension chamber, etc.). The first chamber 826 is a generally cylindrical chamber that includes the portion of the internal volume of the main body 802 between the main piston 824 and the cap 804. The second chamber 828 is an annular chamber defined between the main body 802 and the main tube 816 and extends between the main piston 824 and the barrier 806. When the main tube 816 translates relative to the main body 802, the main piston 824 changes the volume of the first chamber 826 and the second chamber 828. A dividing piston, shown as dividing piston 830 (e.g., floating piston, etc.), is disposed in the main tube 816 and slidably engages the main tube 816. The dividing piston 830 separates the internal volume of the main tube 816 into a first inner chamber 832 and a second inner chamber 834. According to an exemplary embodiment, the first inner chamber 832 is open to (i.e., in fluid communication with, etc.) the first chamber 826.

According to an exemplary embodiment, the first chamber 826, the second chamber 828, and the first inner chamber 832 contain a generally non-compressible fluid (e.g., hydraulic fluid, oil, etc.). According to an exemplary embodiment, the second inner chamber 834 contains a generally compressible fluid that may include (e.g., at least 90%, at least 95%) an inert gas such as nitrogen, argon, or helium, among others. In some embodiments, the second inner chamber 834 is in fluid communication with external devices, such as one or more reservoirs (e.g., central reservoir, tank, etc.), an accumulator, or a device allowing the pressure of the gas to be adjusted via a pressure regulation line. The pressure of the gas may be adjusted by removing or adding a volume of gas to adjust the suspension ride height.

According to an exemplary embodiment, the integrated spring damper 800 includes a pressure regulation line that is located at a top portion (e.g., a top end, an upper end, etc.) of the integrated spring damper 800. As shown in FIGS. 12A-12D, the integrated spring damper 800 includes a port, shown as pressure regulation port 880, coupled to the protruded portion 819 of the cap 818 (e.g., via a threaded interface, welded, etc.). As shown in FIGS. 12C-12D, the pressure regulation port 880 defines a passageway, shown as inlet passageway 882. The protruded portion 819 of the cap 818 defines a passageway, shown as intermediate passageway 822. The intermediate passageway 822 cooperates with the inlet passageway 882 to define the pressure regulation line of the integrated spring damper 800. The pressure regulation line extends from the pressure regulation port 880, through the protruded portion 819 of the cap 818, and into the second inner chamber 834 of the main tube 816. According to an exemplary embodiment, the pressure regulation line of the integrated spring damper 800 facilitates increasing or decreasing a volume of fluid (e.g., an inert gas, etc.) within the second inner chamber 834 of the main tube 816.

According to an exemplary embodiment, the pressure regulation port 880 is positioned at the top of the integrated spring damper 800 to provide a fixed or static location to fill or release gas from the second inner chamber 834 of the integrated spring damper 800. The pressure regulation port 880 is positioned to increase (e.g., maximize, etc.) the travel of the main tube 816 within the main body 802, thereby increasing the stroke of the integrated spring damper 800. By way of example, impulse forces transmitted to occupants within a vehicle from bumps, pot holes, etc. may be reduced by increasing the maximum stroke of the integrated spring damper 800. According to an exemplary embodiment, the pressure regulation port 880 is positioned above the side plate 1000 to reduce the risk of debris (e.g., dirt, rocks, mud, etc.) damaging or blocking the pressure regulation port 880.

When the integrated spring damper 800 is compressed or extended, the main tube 816 translates relative to the main body 802. The gas held in the second inner chamber 834 compresses or expands in response to relative movement between the main tube 816 and the dividing piston 830, which may remain relatively stationary but transmit pressure variations between the incompressible hydraulic fluid in the first inner chamber 832 and the compressible fluid in second inner chamber 834. The gas in the second inner chamber 834 resists compression, providing a force that is a function of the compressibility of the gas, the area of the piston, the volume and geometry of the second inner chamber 834, and the current state (e.g., initial pressure, etc.) of the gas, among other factors. The receipt of potential energy as the gas is compressed, storage of potential energy, and release of potential energy as the gas expands provide a spring function for the integrated spring damper 800.

In one embodiment, the dividing piston 830 defines a cup 831. According to the exemplary embodiment shown in FIG. 12C, the dividing piston 830 is positioned such that the cup 831 facilitates an increase in the volume of the second inner chamber 834. In other embodiments, the dividing piston 830 is positioned such that the cup 831 facilitates an increase in the volume of the first inner chamber 832. The dividing piston 830 may be flipped and repositioned to selectively increase the volume of the first inner chamber 832 or the second inner chamber 834 to tune the performance of the integrated spring damper 800. As shown in FIG. 12C, the cap 818 defines a pocket, shown as cap pocket 823. The cap pocket 823 is structured to increase the volume of the second inner chamber 834. In some embodiments, the cap pocket 823 and the cup 831 increase the volume of the second inner chamber 834. In other embodiments, at least one of the cap pocket 823 and the cup 831 are not defined by the cap 818 and the dividing piston 830, respectively. By way of example, increasing the volume of the second inner chamber 834 (i.e., decreasing the gas pressure within the second inner chamber 834, etc.) may facilitate a softer ride (e.g., a smaller spring force, etc.), while decreasing the volume of the second inner chamber 834 (i.e., increasing the gas pressure within the second inner chamber 834, etc.) may facilitate a stiffer ride (e.g., a greater spring force, etc.).

Referring again to FIG. 12C, a limiter, shown as recoil damper 836, is disposed within the internal volume of the main body 802, between the main piston 824 and the barrier 806. The recoil damper 836 reduces the risk of damage to the main piston 824, barrier 806, the sidewall of main body 802, and still other components of integrated spring damper 800 by reducing the forces imparted by the main piston 824 as it travels toward an end of stroke (i.e., the maximum travel of the stroke, etc.). According to an exemplary embodiment, the recoil damper 836 includes a recoil piston, shown as recoil piston 838, positioned within the second chamber 828 and a resilient member, shown as resilient member 839. The resilient member 839 may include an interlaced wave spring (i.e., a flat wire compression spring, etc.), a coil spring, or another type of spring. The resilient member 839 may be disposed between the recoil piston 838 and the barrier 806. According to an exemplary embodiment, the resilient member 839 is not intended to substantially resist the movement of the main piston 824 but positions the recoil piston 838 within the main body 802, such as after it has been displaced by the main piston 824. In other embodiments, the recoil damper 836 does not include a resilient member, and the recoil piston 838 may be repositioned using gravity or an alternative device.

Occupants within a vehicle experience large impulse forces as the main piston 824 contacts the barrier 806 or a component of the suspension system engages a hard stop. The recoil damper 836 reduces such impulse forces transmitted to occupants within the vehicle by dissipating a portion of the kinetic energy of the main piston 824 and the main tube 816 (i.e. provide a supplemental damping force, etc.) as the integrated spring damper 800 reaches an end of stroke (e.g., as the piston reaches a recoil end of stroke, as the piston reaches a jounce end of stroke, etc.).

Figure 12E:
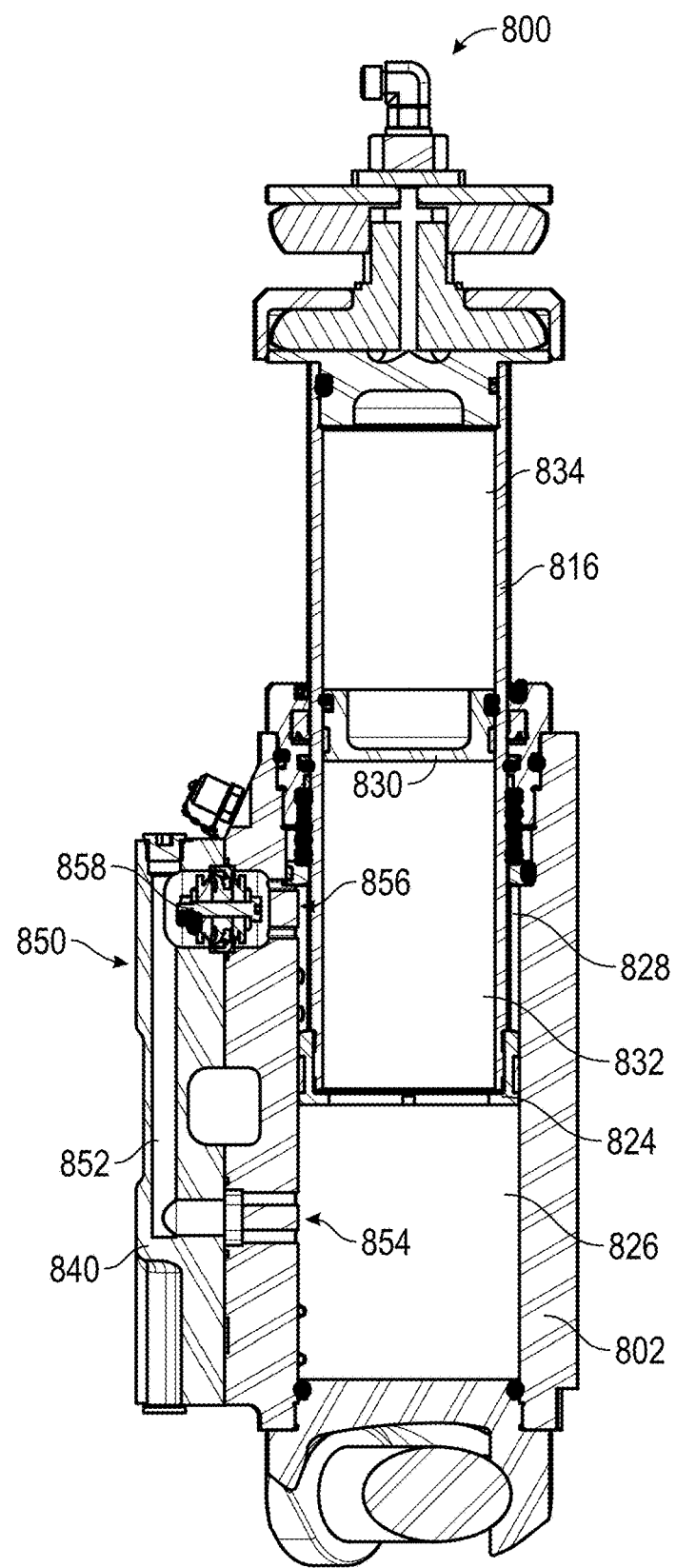
FIG. 12E is sectional view of the suspension element of FIG. 12B.
Figure 12F:
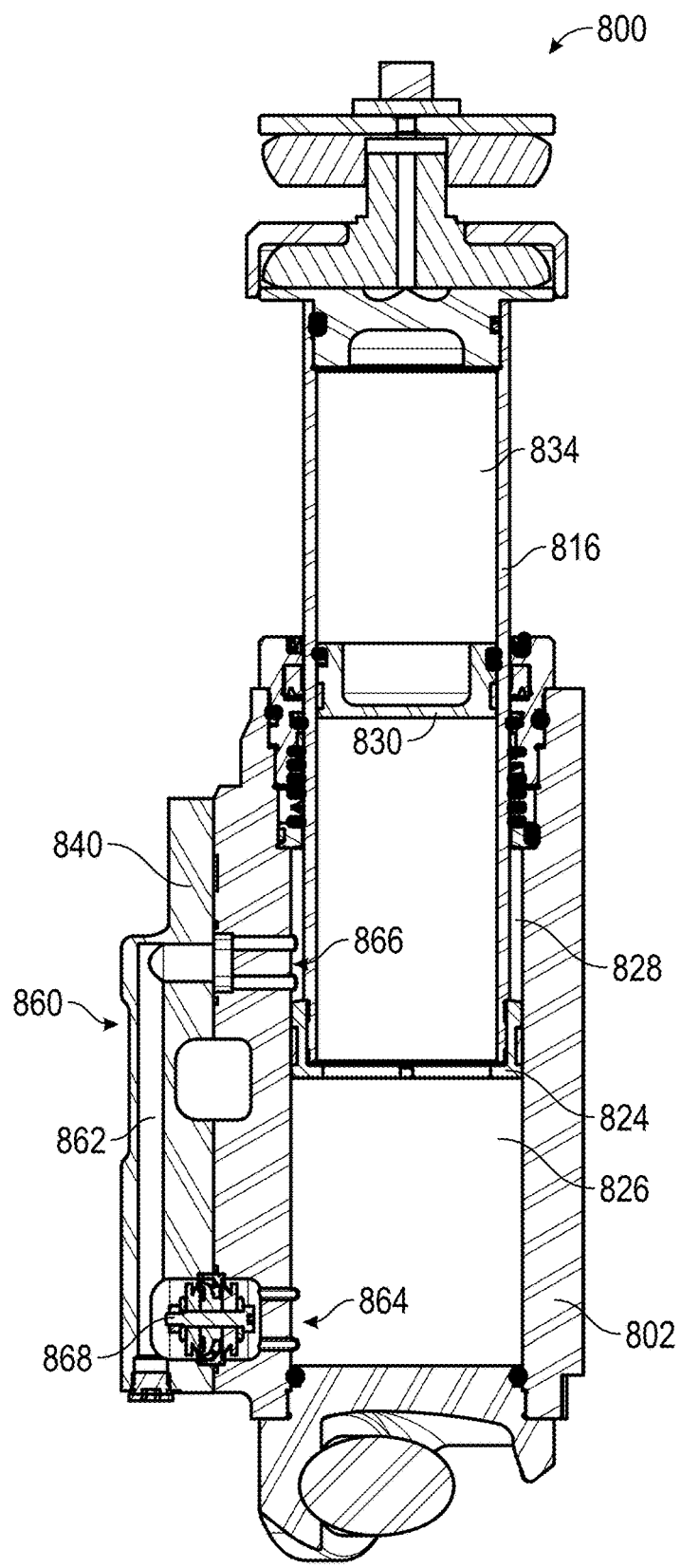
FIG. 12F is another sectional view of the suspension element of FIG. 12B.

Referring now to FIGS. 12E-12F, fluid may flow between the first chamber 826 and the second chamber 828 through at least one of a first passage 852 (e.g., conduit, bore, etc.) of a flow path, shown as first flow path 850, and a second passage 862 of a flow path, shown as second flow path 860, defined by a manifold, shown as bypass manifold 840. In other embodiments, the bypass manifold 840 defines a different number of passages (e.g., one, three, etc.). According to an exemplary embodiment, the bypass manifold 840 is coupled to the side of the main body 802 (e.g., removably coupled to the main body 802 with a plurality of fasteners, etc.). In other embodiments, the bypass manifold 840 and the main body 802 are integrally formed (e.g., a unitary structure, etc.). According to an alternative embodiment, at least one of the first passage 852 and the second passage 862 are formed with tubular members coupled to an outer portion of the main body 802 or with flow passages defined by the main body 802.

According to the exemplary embodiment shown in FIGS. 12C and 12E-12F, damping forces are generated as the flow of fluid through the first passage 852 and the second passage 862 interacts with flow control elements, shown as first flow control device 858 and second flow control device 868. According to an exemplary embodiment, the first flow control device 858 and the second flow control device 868 are bidirectional flow valves disposed within the bypass manifold 840 along the first passage 852 and the second passage 862, respectively. The first flow control device 858 and the second flow control device 868 may include washers that differentially restrict a fluid flow based on the direction that the fluid is flowing. In other embodiments, the first flow control device 858 and the second flow control device 868 are other types of flow control device, such as pop off valves or orifices (e.g., variable flow orifices, etc.). In other embodiments, the first flow control device 858 and the second flow control device 868 are remotely positioned but in fluid communication with the first chamber 826 and the second chamber 828.

According to an exemplary embodiment, the main body 802 defines a plurality of sets of openings. As shown in FIG. 12E, the plurality of sets of openings include a first set having openings 854 and openings 856. The openings 854 and the openings 856 are fluidly coupled by the first passage 852. As shown in FIG. 12F, the plurality of sets of openings include a second set having openings 864 and openings 866. The openings 864 and the openings 866 are fluidly coupled by the second passage 862. According to an exemplary embodiment, the first passage 852 and the second passage 862 are offset relative to one another both circumferentially and longitudinally along the length of the main body 802 and the bypass manifold 840. In other embodiments, the main body 802 defines a different number of sets of openings (e.g., one, three, four, etc.), each set corresponding with one of the passages defined by the bypass manifold 840.

According to an exemplary embodiment, the integrated spring damper 800 provides different damping forces in extension and retraction and also damping forces that vary based on the position of the main piston 824 relative to the main body 802 (e.g., position dependent dampening, etc.). According to an exemplary embodiment, the integrated spring damper 800 provides recoil damping forces in jounce and compression damping forces in recoil as part of a spring force compensation strategy. By way of example, the position dependent dampening of the integrated spring damper 800 may function as follows. As the main piston 824 translates within main body 802 (e.g., due to relative movement between components of a vehicle suspension system, etc.), various openings and their corresponding passages are activated and deactivated. According to an exemplary embodiment, fluid flows through the activated openings and their corresponding passages to provide damping forces that vary based on position and direction of travel of the main piston 824 within the main body 802.

Movement of the main tube 816 relative to the main body 802 translates the main piston 824, causing the volume of the first chamber 826 and the second chamber 828 to vary. When the integrated spring damper 800 compresses, the volume of the first chamber 826 decreases while the volume of the second chamber 828 increases. The fluid is forced from the first chamber 826 through at least one of the openings 854 of the first passage 852 and the openings 864 of the second passage 862 (e.g., based on the position of the main piston 824 within the main body 802, etc.). The fluid flows through at least one the first passage 852 and the second passage 862 past the first flow control device 858 and the second flow control device 868 and out of the openings 856 and the openings 866 into the second chamber 828. The resistance to the flow of the fluid along at least one of the first passage 852 and the second passage 862 and the interaction thereof with the first flow control device 858 and the second flow control device 868 provides a damping function for the integrated spring damper 800 that is independent of the spring function. By way of example, if the non-compressible fluid is able to flow through both the first passage 852 and the second passage 862, the dampening provided by the integrated spring damper 800 will be less than if fluid is able to flow through only one of the first passage 852 and the second passage 862. Therefore, as the main piston 824 moves towards the cap 804, the integrated spring damper 800 provides a first dampening characteristic (e.g., less dampening, etc.) when the openings 854 and the openings 864 are active and a second dampening characteristics (e.g., more dampening, etc.) when only the openings 864 are active (e.g., because the main piston 824 deactivates the openings 854, which may include the openings 854 being positioned within the second chamber 828, etc.).

Referring to FIGS. 13A-13F, an integrated spring damper 900 is shown, according to another exemplary embodiment. The integrated spring damper 900 is similar in construction and function to the integrated spring damper 800.

Figures 13A, 13B:
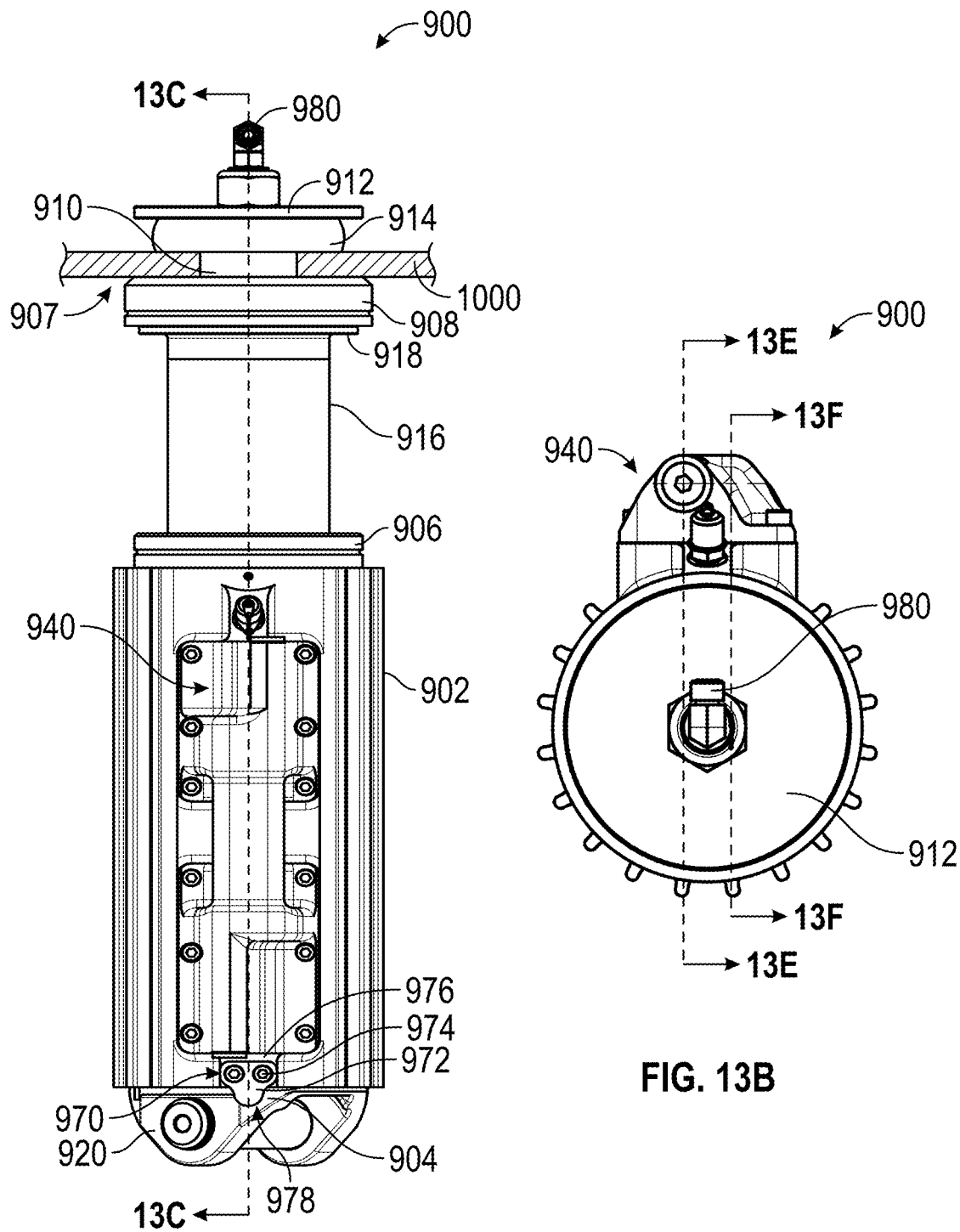
FIG. 13A is a side view of an suspension element, according to an alternative embodiment.
FIG. 13B is a top view of the suspension element of FIG. 13A.
Figure 13C:
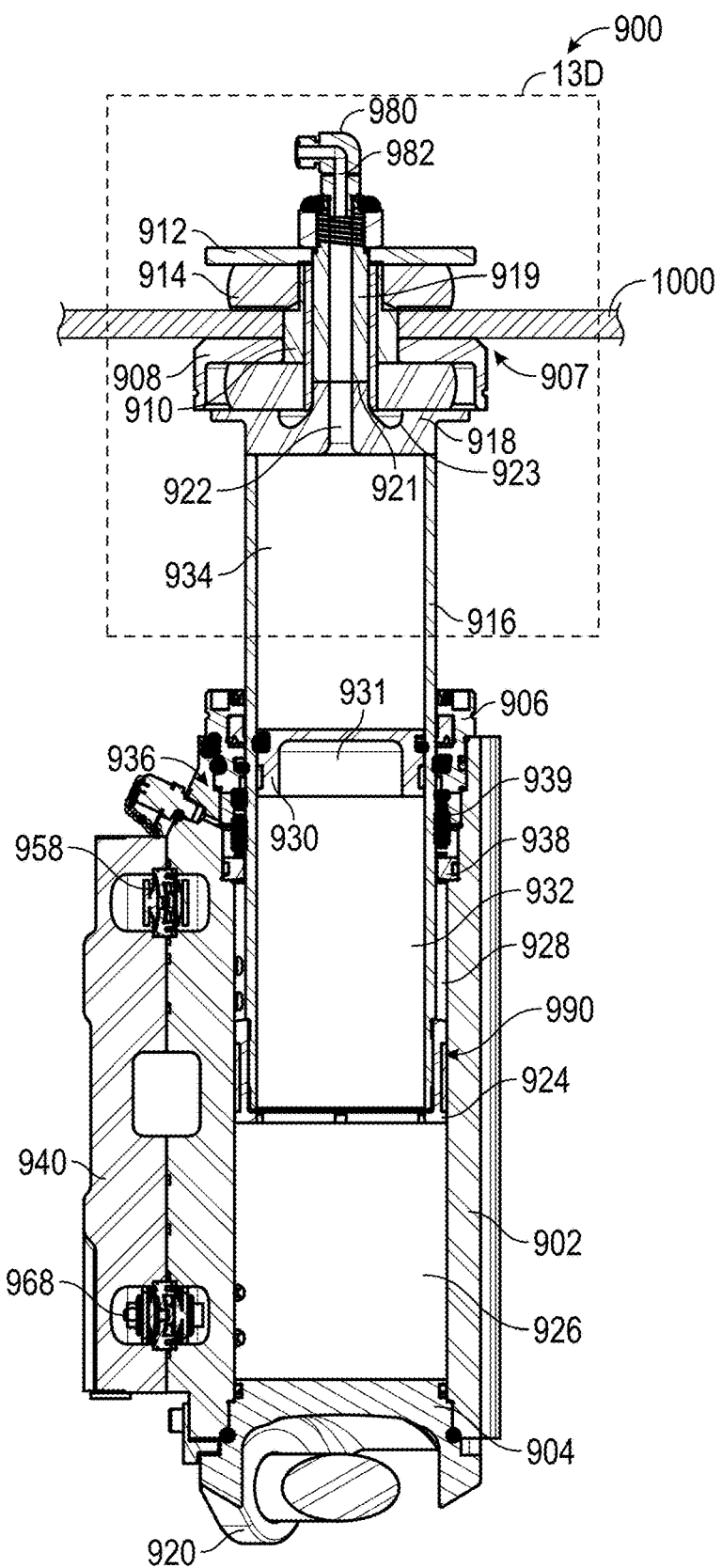
FIG. 13C is a sectional view of the suspension element of FIG. 13A.

As shown in FIG. 13A, the integrated spring damper 900 includes a tubular (e.g., cylindrical, etc.) main body (e.g., cylinder, housing, base, etc.), shown a main body 902. In one embodiment, the main body 902 is manufactured using an extrusion process. In an alternative embodiment, the main body 902 is manufactured using a casting process. As shown in FIGS. 13A and 13C, a cap, shown as cap 904, and a barrier, shown as barrier 906, are disposed on opposing ends of the main body 902, defining an internal volume. According to an exemplary embodiment, the integrated spring damper 900 includes a wearband, shown as wearband 990, positioned between interfacing surfaces of the main body 902 and the main piston 924. The wearband 990 increases the side load and bending load capabilities of the integrated spring damper 900. The integrated spring damper 900 further includes a tubular (e.g., cylindrical, etc.) element, shown as main tube 916. The main tube 916 is at least partially received within the internal volume of the main body 902. The main tube 916 is configured to translate with respect to the main body 902. As shown in FIGS. 13A-13C, a cap, shown as cap 918, is disposed at a distal end of the main tube 916. The cap 904, barrier 906, and cap 918 may be coupled to the respective components with a threaded connection, a friction weld, or with another coupling mechanism (e.g., welding, brazing, interference fit, etc.). In some embodiments, the integrated spring damper 900 includes a plurality of O-rings positioned between components that are coupled with a threaded connection to reduce the risk of contaminants entering into the integrated spring damper 900.

According to the exemplary embodiment shown in FIG. 13A, the integrated spring damper 900 includes a locking mechanism, shown as locking mechanism 970. In one embodiment, the locking mechanism 970 is configured to position (e.g., lock, index, etc.) the cap 904 in a target orientation relative to the main body 902. As shown in FIG. 13A, the locking mechanism 970 includes a retainer, shown as retainer 972. The retainer 972 is removably coupled to the main body 902 with fasteners 974. The retainer 972 engages a face, shown as face 976, defined by (e.g., machined into, etc.) the main body 902. The cap 904 includes an interfacing surface, shown as flat 978. The retainer 972 may be coupled to the main body 902 via the fasteners 974 when the flat 978 aligns with the face 976 (i.e., indicating the target orientation, etc.) to facilitate locking the cap 904 in the target orientation. The locking mechanism 970 may facilitate indexing a lower mount of the integrated spring damper 900 relative to other components thereof and thereby facilitate mounting integrated spring damper 900 onto a vehicle.

According to an exemplary embodiment, the integrated spring damper 900 includes a first mounting portion (e.g., a lower mounting portion, etc.), shown as eyelet 920, with which the integrated spring damper 900 is coupled to one portion of an axle assembly (e.g., a lower portion of the axle assembly, etc.). According to an exemplary embodiment, the integrated spring damper 900 is coupled on one end (e.g., via the eyelet 920 on a lower end, etc.) to a moveable member of the axle assembly (e.g., a lower support arm, etc.). According to an exemplary embodiment, the eyelet 920 is integrally formed with the cap 904. According to an exemplary embodiment, the eyelet 920 receives a pin to rotatably couple the eyelet 920 to a lower portion of the axle assembly (e.g., lower support arm, etc.). In one embodiment, the pin is sized to allow an elastomeric bushing to fit between the pin and the lower support arm. As shown in FIG. 13A, the integrated spring damper 900 includes a second mounting portion (e.g., an upper mounting portion, a pin mount, etc.), shown as upper mount 907. The upper mount 907 is configured to couple an opposing second end (e.g., an upper end, etc.) of the integrated spring damper 900 to a vehicle body, frame member, or part thereof (e.g., chassis, side plate, hull, etc.), shown as side plate 1000.

Figure 13D:
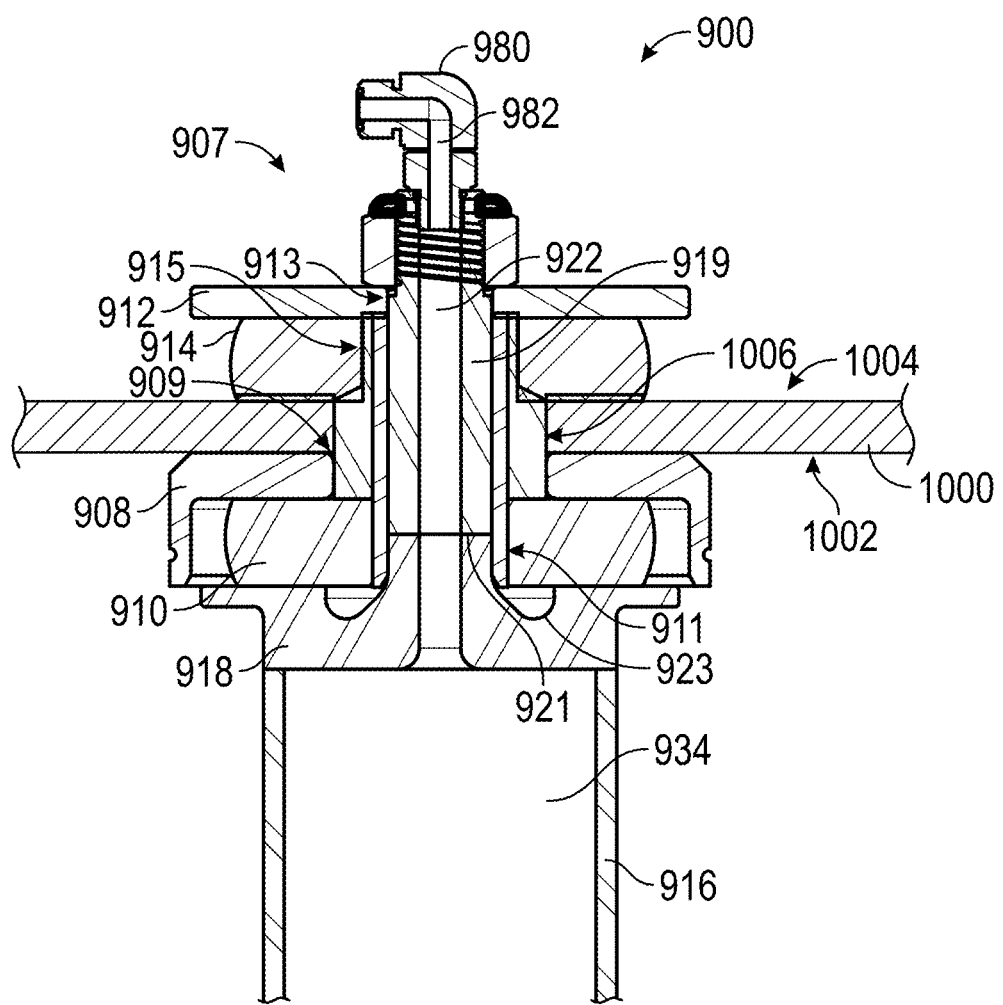
FIG. 13D is a detail view of an upper mount of the suspension element of FIG. 13C.

As shown in FIGS. 13A and 13C-13D, the upper mount 907 includes a first mounting member 908, a second mounting member 910, a third mounting member 912, and a fourth mounting member 914. As shown in FIGS. 13A and 13D, the first mounting member 908 is positioned such that a top surface of the first mounting member 908 abuts a first surface of the side plate 1000, shown as bottom surface 1002. In one embodiment, the first mounting member 908 is constructed from a metal or wear resistant material. As shown in FIG. 13C-13D, the second mounting member 910 includes a portion (e.g., a lower portion, a first portion, a non-protruded portion, etc.) that is positioned between the cap 918 and the first mounting member 908. In one embodiment, the second mounting member 910 is a resilient member, such as a flexible urethane, that serves as an isolator and an elastomeric spacer. The second mounting member 910 may be configured to isolate the cap 918 from at least one of the first mounting member 908 and the side plate 1000. In some embodiments, the first mounting member 908 and the second mounting member 910 are annular and circular in shape. In other embodiments, the first mounting member 908 and the second mounting member 910 have another shape (e.g., discus square, hexagonal, etc.).

As shown in FIGS. 13A and 13D, the fourth mounting member 914 is positioned between the side plate 1000 and the third mounting member 912. A second surface, shown as top surface 1004, of the side plate 1000 is in contact with a bottom surface of the fourth mounting member 914, and the third mounting member 912 is disposed on a top surface of the fourth mounting member 914. The first mounting member 908 and the fourth mounting member 914 are spaced to receive the side plate 1000. In one embodiment, the fourth mounting member 914 is a resilient member, such as a flexible urethane, that serves as an isolator and an elastomeric spacer. The fourth mounting member 914 may be configured to isolate the third mounting member 912 from the side plate 1000. In one embodiment, the third mounting member 912 is constructed from a metal or wear resistant material. In some embodiments, the third mounting member 912 and the fourth mounting member 914 are annular and circular in shape. In other embodiments, the third mounting member 912 and the fourth mounting member 914 have another shape (e.g., discus square, hexagonal, etc.).

As shown in FIG. 13D, the first mounting member 908 defines an aperture, shown as aperture 909, that corresponds with (e.g., aligns with, cooperates with, etc.) an aperture defined by side plate 1000, shown as side plate aperture 1006. The second mounting member 910 includes a protruded portion (e.g., a second portion, an upper portion, etc.) that extends through the aperture 909 and the side plate aperture 1006 and engages with an aperture, shown as aperture 915, defined by the fourth mounting member 914. In one embodiment, the aperture 915 receives the protruded portion of the second mounting member 910. The second mounting member 910 defines an aperture, shown as bore 911, that extends longitudinally through the second mounting member 910 and aligns with (e.g., cooperates with, etc.) an aperture, shown as aperture 913, defined by the third mounting member 912. The bore 911 and the aperture 913 receive a protruded portion 919 of the cap 918. In one embodiment, the protruded portion 919 is coupled to the cap 918 by a friction weld 921. In other embodiments, the cap 918 and the protruded portion 919 are integrally formed. According to an exemplary embodiment, the friction weld 921 between the cap 918 and the protruded portion 919 is positioned to reduce stress concentration within the cap 918 and the integrated spring damper 900 such that the side plate 1000 carries substantially all of the stresses generated during the use of the integrated spring damper 900. In some embodiments, the cap 918 includes notches, shown as notches 923. The notches 923 may be at least one of shaped and positioned to substantially reduce stress concentration within the cap 918.

As shown in FIG. 13C, a main piston, shown as main piston 924, is disposed in the internal volume of the main body 902. The main piston 924 is coupled to the main tube 916 and slidably engages the main body 902. The main piston 924 separates the internal volume into a first chamber 926 (e.g., compression chamber, etc.) and a second chamber 928 (e.g., extension chamber, etc.). The first chamber 926 is a generally cylindrical chamber that includes the portion of the internal volume of the main body 902 between the main piston 924 and the cap 904. The second chamber 928 is an annular chamber defined between the main body 902 and the main tube 916 and extends between the main piston 924 and the barrier 906. When the main tube 916 translates relative to the main body 902, the main piston 924 changes the volume of the first chamber 926 and the second chamber 928. A dividing piston, shown as dividing piston 930 (e.g., floating piston, etc.), is disposed in the main tube 916 and slidably engages the main tube 916. The dividing piston 930 separates the internal volume of the main tube 916 into a first inner chamber 932 and a second inner chamber 934. According to an exemplary embodiment, the first inner chamber 932 is open to (i.e., in fluid communication with, etc.) the first chamber 926.

According to an exemplary embodiment, the first chamber 926, the second chamber 928, and the first inner chamber 932 contain a generally non-compressible fluid (e.g., hydraulic fluid, oil, etc.). According to an exemplary embodiment, the second inner chamber 934 contains a generally compressible fluid that may include (e.g., at least 90%, at least 95%) an inert gas such as nitrogen, argon, or helium, among others. In some embodiments, the second inner chamber 934 is in fluid communication with external devices, such as one or more reservoirs (e.g., central reservoir, tank, etc.), an accumulator, or a device allowing the pressure of the gas to be adjusted via a pressure regulation line. The pressure of the gas may be adjusted by removing or adding a volume of gas to adjust the suspension ride height.

According to an exemplary embodiment, the integrated spring damper 900 includes a pressure regulation line that is located at a top portion (e.g., a top end, an upper end, etc.) of the integrated spring damper 900. As shown in FIGS. 13A-13D, the integrated spring damper 900 includes a port, shown as pressure regulation port 980, coupled to the protruded portion 919 of the cap 918 (e.g., via a threaded interface, welded, etc.). As shown in FIGS. 13C-13D, the pressure regulation port 980 defines a passageway, shown as inlet passageway 982. The protruded portion 919 of the cap 918 defines a passageway, shown as intermediate passageway 922. The intermediate passageway 922 cooperates with the inlet passageway 982 to define the pressure regulation line of the integrated spring damper 900. The pressure regulation line extends from the pressure regulation port 980, through the protruded portion 919 of the cap 918, and into the second inner chamber 934 of the main tube 916. According to an exemplary embodiment, the pressure regulation line of the integrated spring damper 900 facilitates increasing or decreasing a volume of fluid (e.g., an inert gas, etc.) within the second inner chamber 934 of the main tube 916.

According to an exemplary embodiment, the pressure regulation port 980 is positioned at the top of the integrated spring damper 900 to provide a fixed or static location to fill or release gas from the second inner chamber 934 of the integrated spring damper 900. The pressure regulation port 980 is positioned to increase (e.g., maximize, etc.) the travel of the main tube 916 within the main body 902, thereby increasing the stroke of the integrated spring damper 900. By way of example, impulse forces transmitted to occupants within a vehicle from bumps, pot holes, etc. may be reduced by increasing the maximum stroke of the integrated spring damper 900. According to an exemplary embodiment, the pressure regulation port 980 is positioned above the side plate 1000 to reduce the risk of debris (e.g., dirt, rocks, mud, etc.) damaging or blocking the pressure regulation port 980.

When the integrated spring damper 900 is compressed or extended, the main tube 916 translates relative to the main body 902. The gas held in the second inner chamber 934 compresses or expands in response to relative movement between the main tube 916 and the dividing piston 930, which may remain relatively stationary but transmit pressure variations between the incompressible hydraulic fluid in the first inner chamber 932 and the compressible fluid in second inner chamber 934. The gas in the second inner chamber 934 resists compression, providing a force that is a function of the compressibility of the gas, the area of the piston, the volume and geometry of the second inner chamber 934, and the current state (e.g., initial pressure, etc.) of the gas, among other factors. The receipt of potential energy as the gas is compressed, storage of potential energy, and release of potential energy as the gas expands provide a spring function for the integrated spring damper 900.

In one embodiment, the dividing piston 930 defines a cup 931. According to the exemplary embodiment shown in FIG. 13C, the dividing piston 930 is positioned such that the cup 931 facilitates an increase in the volume of the first inner chamber 932. In alternate embodiments, the dividing piston 930 is positioned such that the cup 931 facilitates an increase in the volume of the second inner chamber 934. The dividing piston 930 may be flipped and repositioned to selectively increase the volume of the first inner chamber 932 or the second inner chamber 934 to tune the performance of the integrated spring damper 900. In other embodiments, the cup 931 is not defined by the dividing piston 930. By way of example, increasing the volume of the second inner chamber 934 (i.e., decreasing the gas pressure within the second inner chamber 934, etc.) may facilitate a softer ride (e.g., a smaller spring force, etc.), while decreasing the volume of the second inner chamber 934 (i.e., increasing the gas pressure within the second inner chamber 934, etc.) may facilitate a stiffer ride (e.g., a greater spring force, etc.).

Referring again to FIG. 13C, a limiter, shown as recoil damper 936, is disposed within the internal volume of the main body 902, between the main piston 924 and the barrier 906. The recoil damper 936 reduces the risk of damage to the main piston 924, barrier 906, the sidewall of main body 902, and still other components of integrated spring damper 900 by reducing the forces imparted by the main piston 924 as it travels toward an end of stroke (i.e., the maximum travel of the stroke, etc.). According to an exemplary embodiment, the recoil damper 936 includes a recoil piston, shown as recoil piston 938, positioned within the second chamber 928 and a resilient member, shown as resilient member 939. The resilient member 939 may include an interlaced wave spring (i.e., a flat wire compression spring, etc.), a coil spring, or another type of spring. The resilient member 939 may be disposed between the recoil piston 938 and the barrier 906. According to an exemplary embodiment, the resilient member 939 is not intended to substantially resist the movement of the main piston 924 but positions the recoil piston 938 within the main body 902, such as after it has been displaced by the main piston 924. In other embodiments, the recoil damper 936 does not include a resilient member, and the recoil piston 938 is repositioned using gravity or an alternative device.

Occupants within a vehicle experience large impulse forces as the main piston 924 contacts the barrier 906 or a component of the suspension system engages a hard stop. The recoil damper 936 reduces such impulse forces transmitted to occupants within the vehicle by dissipating a portion of the kinetic energy of the main piston 924 and the main tube 916 (i.e. provide a supplemental damping force, etc.) as the integrated spring damper 900 reaches an end of stroke (e.g., as the piston reaches a recoil end of stroke, as the piston reaches a jounce end of stroke, etc.). Recoil dampers (e.g., recoil damper 836, recoil damper 936, etc.) are discussed in U.S. patent application Ser. No. 13/792,151, filed Mar. 10, 2013, which is incorporated herein by reference in its entirety.

Figure 13E:
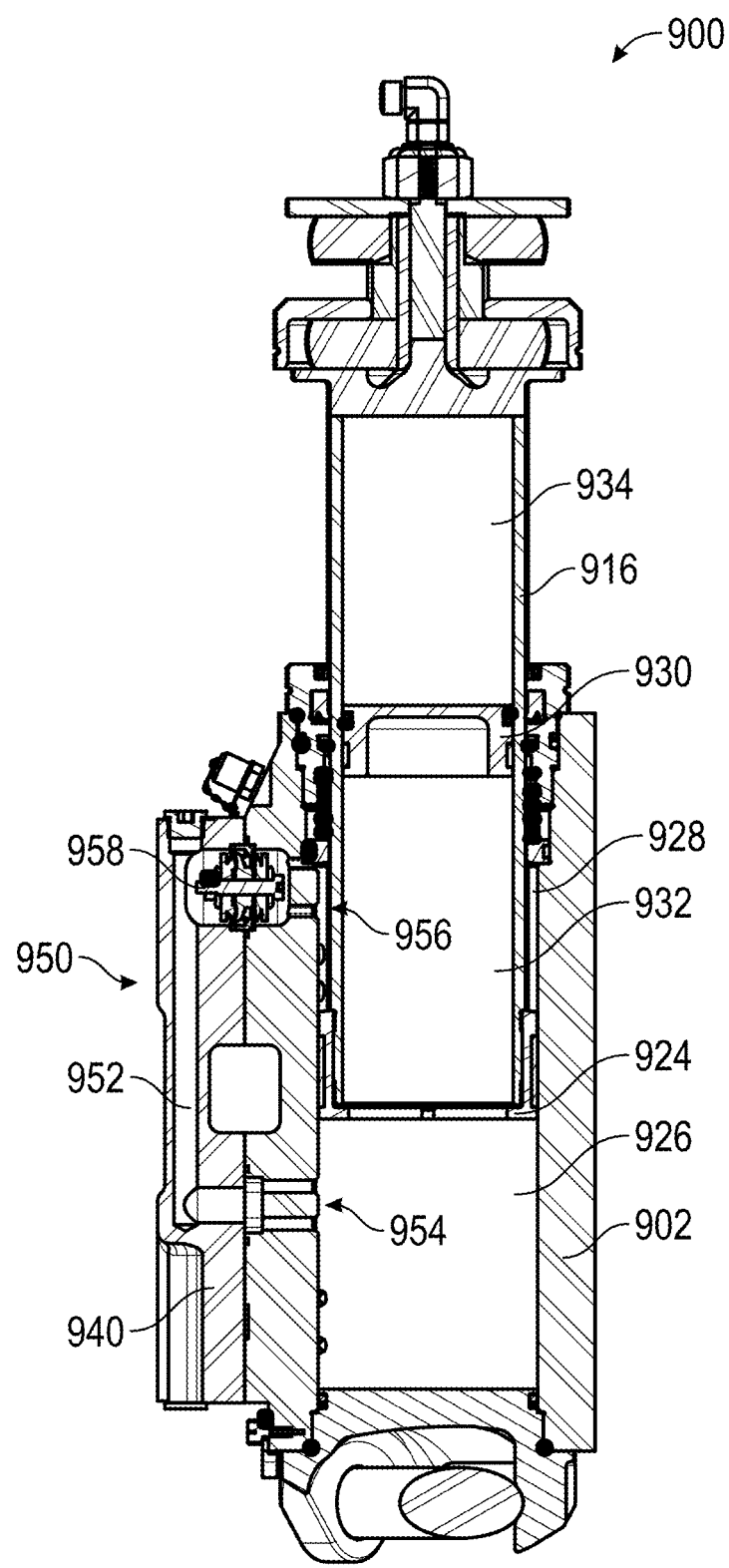
FIG. 13E is sectional view of the suspension element of FIG. 13B.
Figure 13F:
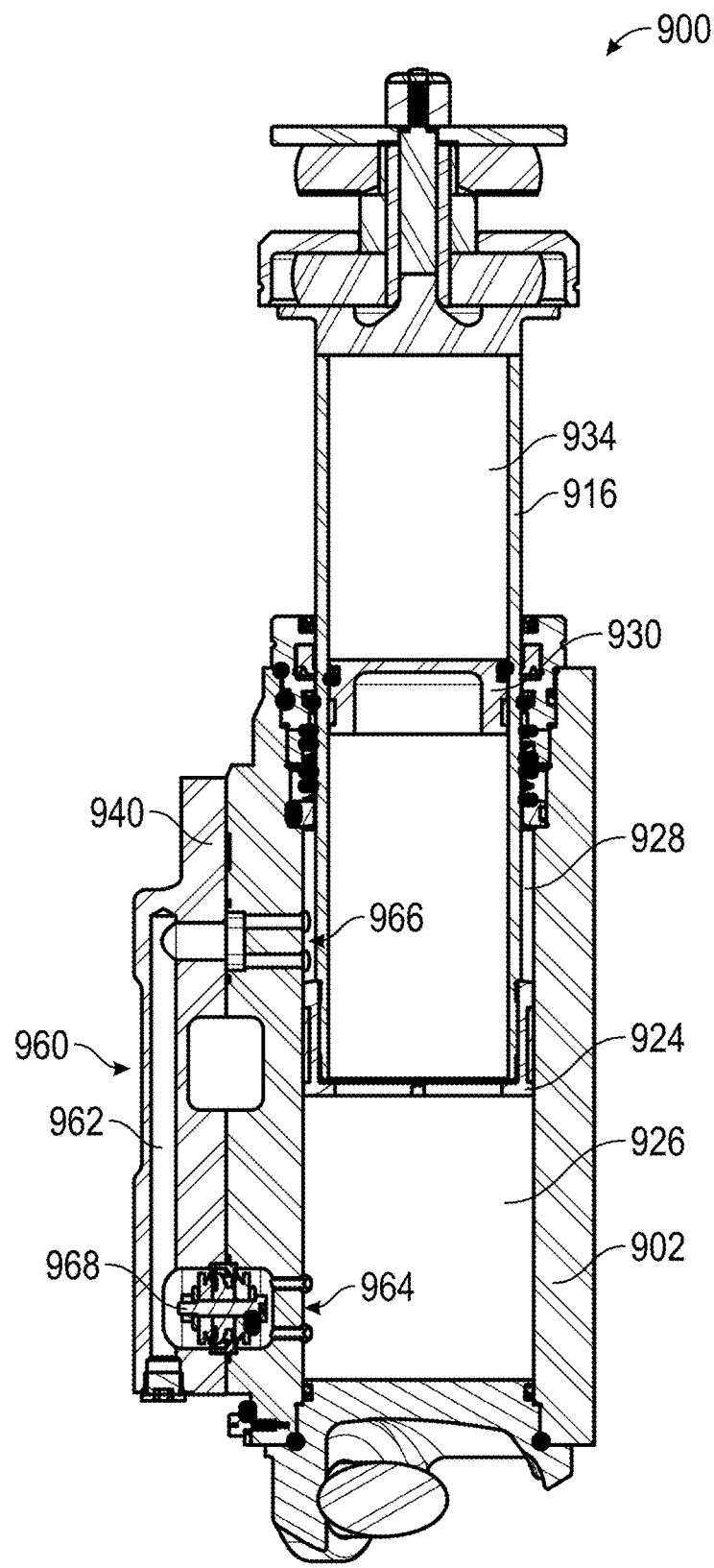
FIG. 13F is another sectional view of the suspension element of FIG. 13B.

Referring now to FIGS. 13E-13F, fluid may flow between the first chamber 926 and the second chamber 928 through at least one of a first passage 952 (e.g., conduit, bore, etc.) of a flow path, shown as first flow path 950, and a second passage 962 of a flow path, shown as second flow path 960, defined by a manifold, shown as bypass manifold 940. In other embodiments, the bypass manifold 940 defines a different number of passages (e.g., one, three, etc.). According to an exemplary embodiment, the bypass manifold 940 is coupled to the side of the main body 902 (e.g., removably coupled to the main body 902 with a plurality of fasteners, etc.). In other embodiments, the bypass manifold 940 and the main body 902 are integrally formed (e.g., a unitary structure, etc.). According to an alternative embodiment, at least one of the first passage 952 and the second passage 962 are formed with tubular members coupled to an outer portion of the main body 902 or with flow passages defined by the main body 902.

According to the exemplary embodiment shown in FIGS. 13C and 13E-13F, damping forces are generated as the flow of fluid through the first passage 952 and the second passage 962 interacts with flow control elements, shown as first flow control device 958 and second flow control device 968. According to an exemplary embodiment, the first flow control device 958 and the second flow control device 968 are bidirectional flow valves disposed within the bypass manifold 940 along the first passage 952 and the second passage 962, respectively. The first flow control device 958 and the second flow control device 968 may include washers that differentially restrict a fluid flow based on the direction that the fluid is flowing. In other embodiments, the first flow control device 958 and the second flow control device 968 are other types of flow control devices, such as pop off valves or orifices (e.g., variable flow orifices, etc.). In other embodiments, the first flow control device 958 and the second flow control device 968 are remotely positioned but in fluid communication with the first chamber 926 and the second chamber 928.

According to an exemplary embodiment, the main body 902 defines a plurality of sets of openings. As shown in FIG. 13E, the plurality of sets of openings include a first set having openings 954 and openings 956. The openings 954 and the openings 956 are fluidly coupled by the first passage 952. As shown in FIG. 13F, the plurality of sets of openings include a second set having openings 964 and openings 966. The openings 964 and the openings 966 are fluidly coupled by the second passage 962. According to an exemplary embodiment, the first passage 952 and the second passage 962 are offset relative to one another both circumferentially and longitudinally along the length of the main body 902 and the bypass manifold 940. In other embodiments, the main body 902 defines a different number of sets of openings (e.g., one, three, four, etc.), each set corresponding with one of the passages defined by the bypass manifold 940.

According to an exemplary embodiment, the integrated spring damper 900 provides different damping forces in extension and retraction and also damping forces that vary based on the position of the main piston 924 relative to the main body 902 (e.g., position dependent dampening, etc.). Position dependent dampening is discussed in U.S. Pat. No. 8,801,017, issued Aug. 12, 2014, which is incorporated herein by reference in its entirety. According to an exemplary embodiment, the integrated spring damper 900 provides recoil damping forces in jounce and compression damping forces in recoil as part of a spring force compensation strategy. By way of example, the position dependent dampening of the integrated spring damper 900 may function as follows. As the main piston 924 translates within main body 902 (e.g., due to relative movement between components of a vehicle suspension system, etc.), various openings and their corresponding passages are activated and deactivated. According to an exemplary embodiment, fluid flows through the activated openings and their corresponding passages to provide damping forces that vary based on position and direction of travel of the main piston 924 within the main body 902.

Movement of the main tube 916 relative to the main body 902 translates the main piston 924, causing the volume of the first chamber 926 and the second chamber 928 to vary. When the integrated spring damper 900 compresses, the volume of the first chamber 926 decreases while the volume of the second chamber 928 increases. The fluid is forced from the first chamber 926 through at least one of the openings 954 of the first passage 952 and the openings 964 of the second passage 962 (e.g., based on the position of the main piston 924 within the main body 902, etc.). The fluid flows through at least one the first passage 952 and the second passage 962 past the first flow control device 958 and the second flow control device 968 and out of the openings 956 and the openings 966 into the second chamber 928. The resistance to the flow of the fluid along at least one of the first passage 952 and the second passage 962 and the interaction thereof with the first flow control device 958 and the second flow control device 968 provides a damping function for the integrated spring damper 900 that is independent of the spring function. By way of example, if the non-compressible fluid is able to flow through both the first passage 952 and the second passage 962, the dampening provided by the integrated spring damper 900 will be less than if fluid is able to flow through only one of the first passage 952 and the second passage 962. Therefore, as the main piston 924 moves towards the cap 904, the integrated spring damper 900 provides a first dampening characteristic (e.g., less dampening, etc.) when the openings 954 and the openings 964 are active and a second dampening characteristics (e.g., more dampening, etc.) when only the openings 964 are active (e.g., because the main piston 924 deactivates the openings 954, which may include the openings 954 being positioned within the second chamber 928, etc.).

It should be understood that the components of various suspension elements described herein may have various cross-sectional shapes (e.g., cylindrical, rectangular, square, hexagonal, etc.). According to an exemplary embodiment, the components of the integrated spring dampers are coupled with seals (e.g., bushings, wear bands, o-rings, etc.) that are configured to prevent pressurized fluid from passing between the chambers discussed herein or leaking out of the integrated spring dampers.

The construction and arrangements of the integrated spring damper, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

The invention claimed is:

1. A suspension element, comprising:
   a main body having an internal volume;
   a tubular element extending at least partially within the main body, wherein the tubular element has an internal volume that defines a first fluid chamber, and wherein the main body and the tubular element each include a sidewall having an inner surface and an outer surface;
   a first piston assembly separating the internal volume of the main body into a second fluid chamber and a third fluid chamber, the third fluid chamber defined by at least portions of the outer surface of the tubular element, the inner surface of the main body, and a surface of the first piston assembly;
   a second piston assembly positioned to separate the first fluid chamber from the second fluid chamber, the second piston assembly including a first side that is directly exposed to the first fluid chamber and a second side that is directly exposed to the second fluid chamber; and
   at least one flow control element disposed along a flow path between the second fluid chamber and the third fluid chamber and configured to permit flow therethrough in both a first direction and an opposing second direction, wherein the sidewall of the main body defines an aperture therethrough that forms a portion of the flow path, and wherein the first piston assembly is configured to prevent direct fluid communication between the second fluid chamber and the third fluid chamber during an extension and a contraction of the tubular element.

2. The suspension element of claim 1, wherein the first piston assembly couples the tubular element to the main body.

3. The suspension element of claim 1, wherein the first piston assembly extends between the tubular element and the inner surface of the main body.

4. The suspension element of claim 3, further comprising a cap disposed over a first end of the main body.

5. The suspension element of claim 4, further comprising a barrier coupled to a second end of the main body, wherein the barrier is annular and includes an aperture configured to receive the sidewall of the tubular element therethrough.

6. The suspension element of claim 5, wherein the cap defines an aperture in fluid communication with the second fluid chamber and the third fluid chamber.

7. The suspension element of claim 6, wherein the at least one flow control element is integrated into the cap.

8. The suspension element of claim 6, wherein the at least one flow control element is coupled to the main body.

9. The suspension element of claim 5, further comprising a manifold defining a passage that couples the second fluid chamber with the third fluid chamber, wherein the manifold defines at least a portion of the flow path.

10. The suspension element of claim 9, wherein the manifold comprises a second tubular element, and wherein the sidewall of the main body is disposed at least partially within the second tubular element.

11. The suspension element of claim 1, wherein the second fluid chamber and the third fluid chamber comprise hydraulic chambers configured to contain a hydraulic fluid therein.

12. A suspension assembly, comprising:
    a wheel end assembly;
    an upper support arm coupled to the wheel end assembly;
    a lower support arm coupled to the wheel end assembly;
    a suspension element coupled to at least one of the upper support arm and the lower support arm, the suspension element comprising:
      a main body having an internal volume;
      a tubular element extending at least partially within the main body, wherein the tubular element has an internal volume that defines a first fluid chamber, and wherein the main body and the tubular element each include a sidewall having an inner surface and an outer surface;
      a first piston assembly separating the internal volume of the main body into a second fluid chamber and a third fluid chamber, the third fluid chamber defined by at least portions of the outer surface of the tubular element, the inner surface of the main body, and a surface of the first piston assembly;
      a second piston assembly positioned to separate the first fluid chamber from the second fluid chamber, the second piston assembly including a first side that is directly exposed to the first fluid chamber and a second side that is directly exposed to the second fluid chamber; and
      at least one flow control element disposed along a flow path between the second fluid chamber and the third fluid chamber and configured to permit flow therethrough in both a first direction and an opposing second direction, wherein the sidewall of the main body defines an aperture therethrough that forms a portion of the flow path, and wherein the first piston assembly is configured to prevent direct fluid communication between the second fluid chamber and the third fluid chamber during an extension and a contraction of the tubular element.

13. The suspension assembly of claim 12, wherein the first piston assembly couples the tubular element to the main body.

14. The suspension assembly of claim 12, wherein the first piston assembly extends between the tubular element and the inner surface of the main body.

15. The suspension assembly of claim 12, further comprising a cap disposed over a first end of the main body.

16. The suspension assembly of claim 15, wherein the at least one flow control element is integrated into the cap.

17. The suspension assembly of claim 12, wherein the second fluid chamber and the third fluid chamber comprise hydraulic chambers configured to contain a hydraulic fluid therein.

* * * * *